US008582823B2

(12) United States Patent
Kunihiro et al.

(10) Patent No.: US 8,582,823 B2
(45) Date of Patent: Nov. 12, 2013

(54) IMAGE PROCESSING APPARATUS, METHOD, AND PROGRAM

(75) Inventors: Takeshi Kunihiro, Kanagawa (JP); Tomohiro Hayakawa, Saitama (JP); Masashi Uchida, Tokyo (JP); Eriko Matsui, Tokyo (JP)

(73) Assignee: Sony Corporation, Tokyo (JP)

( * ) Notice: Subject to any disclaimer, the term of this patent is extended or adjusted under 35 U.S.C. 154(b) by 27 days.

(21) Appl. No.: 13/269,239

(22) Filed: Oct. 7, 2011

(65) Prior Publication Data

US 2012/0093373 A1     Apr. 19, 2012

(30) Foreign Application Priority Data

Oct. 19, 2010 (JP) .............................. P2010-234505
Feb. 28, 2011 (JP) .............................. P2011-043329

(51) Int. Cl.
*G06K 9/00* (2006.01)
(52) U.S. Cl.
USPC .......................................... 382/107; 382/106
(58) Field of Classification Search
None
See application file for complete search history.

(56) References Cited

U.S. PATENT DOCUMENTS

| | | | | |
|---|---|---|---|---|
| 6,661,470 B1 * | 12/2003 | Kawakami et al. | ............ | 348/699 |
| 7,672,369 B2 * | 3/2010 | Garakani et al. | ......... | 375/240.01 |
| 8,031,211 B2 * | 10/2011 | Shekhar et al. | ................ | 345/648 |
| 8,184,129 B2 * | 5/2012 | Shekhar et al. | ................ | 345/648 |
| 8,207,992 B2 * | 6/2012 | Shekhar et al. | ................ | 345/648 |
| 8,339,475 B2 * | 12/2012 | Atanassov et al. | .......... | 348/229.1 |
| 2003/0185450 A1 * | 10/2003 | Garakani et al. | .............. | 382/232 |
| 2006/0275745 A1 | 12/2006 | Schwarz | | |
| 2010/0104203 A1 * | 4/2010 | Garakani et al. | .............. | 382/228 |

FOREIGN PATENT DOCUMENTS

| | | |
|---|---|---|
| JP | 63-233392 | 9/1988 |
| WO | WO 03/077552 A1 | 9/2003 |

OTHER PUBLICATIONS

Germain, F., et al., "Characterization of Cell Deformation and Migration Using a Parametric Estimation of Image Motion", IEEE Transactions on Biomedical Engineering, vol. 46, No. 5, pp. 584-600, (1999).
Extended European Search Report issued in corresponding European Application No. EP 11 18 2945, including Annex to the European Search Report, mailed Dec. 22, 2011 (8 pages).

* cited by examiner

*Primary Examiner* — Nancy Bitar
(74) *Attorney, Agent, or Firm* — Sherr & Jiang, PLLC

(57) ABSTRACT

An image processing apparatus includes: a motion detection unit detecting a motion of a subject to be evaluated by using an image of the subject to be evaluated; a correlation calculation unit calculating a temporal change correlation between motion amounts of a plurality of portions of the subject to be evaluated, by using a motion vector indicating the motion of the subject to be evaluated, which is detected by the motion detection unit; and an evaluation value calculation unit calculating an evaluation value to evaluate cooperativity of the motion of the subject to be evaluated, by using the correlation calculated by the correlation calculation unit.

12 Claims, 28 Drawing Sheets

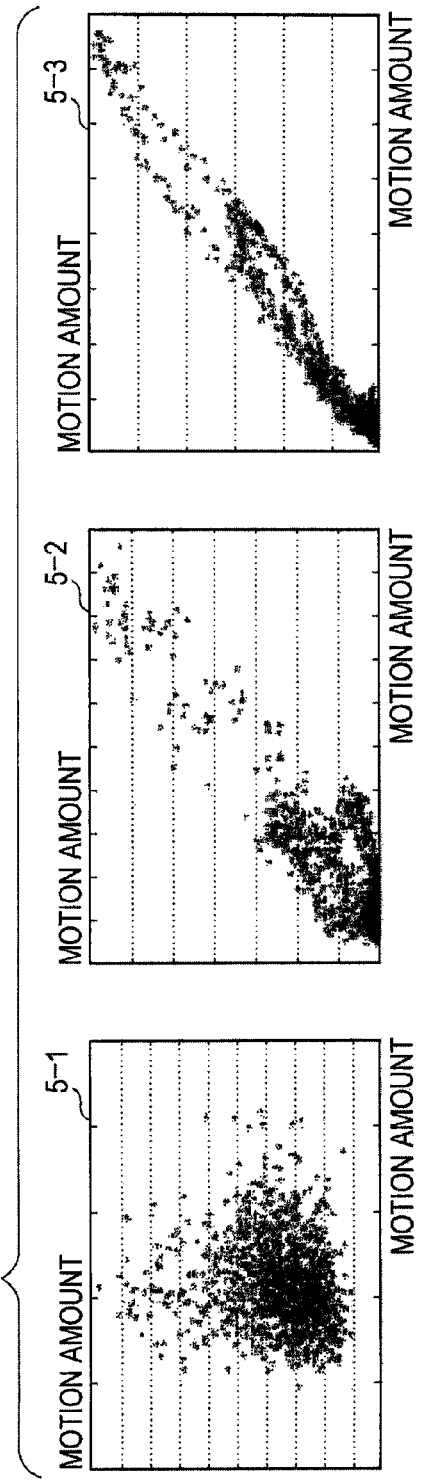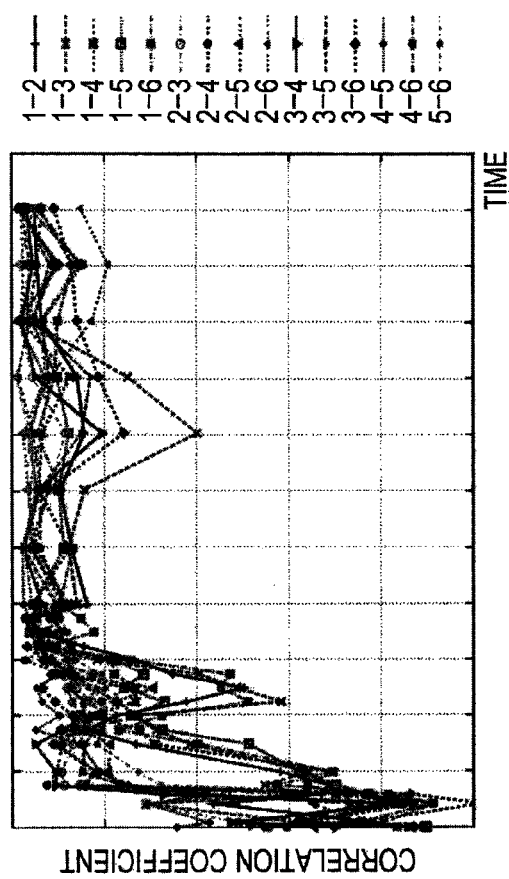
FIG. 2A
FIG. 2B

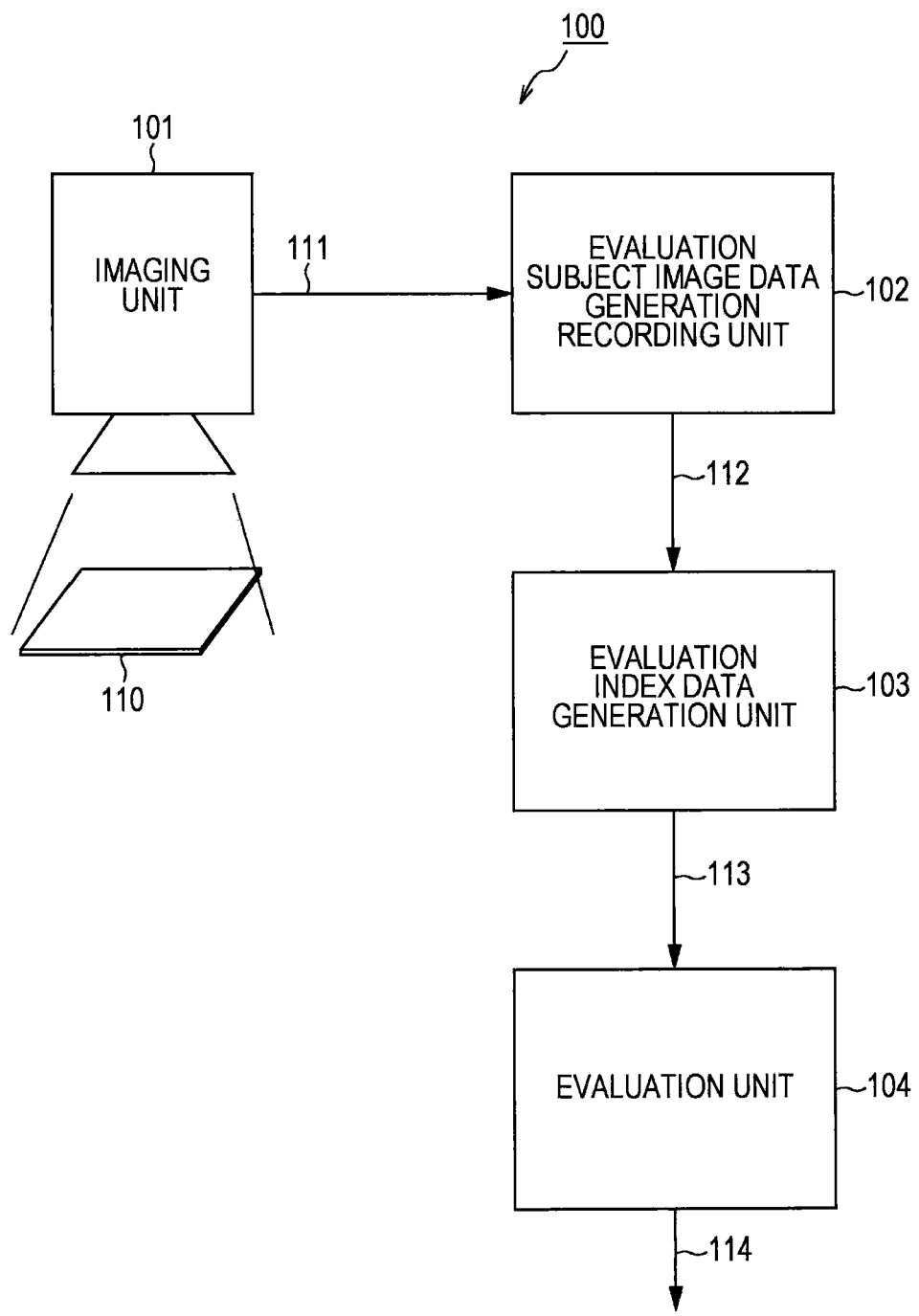

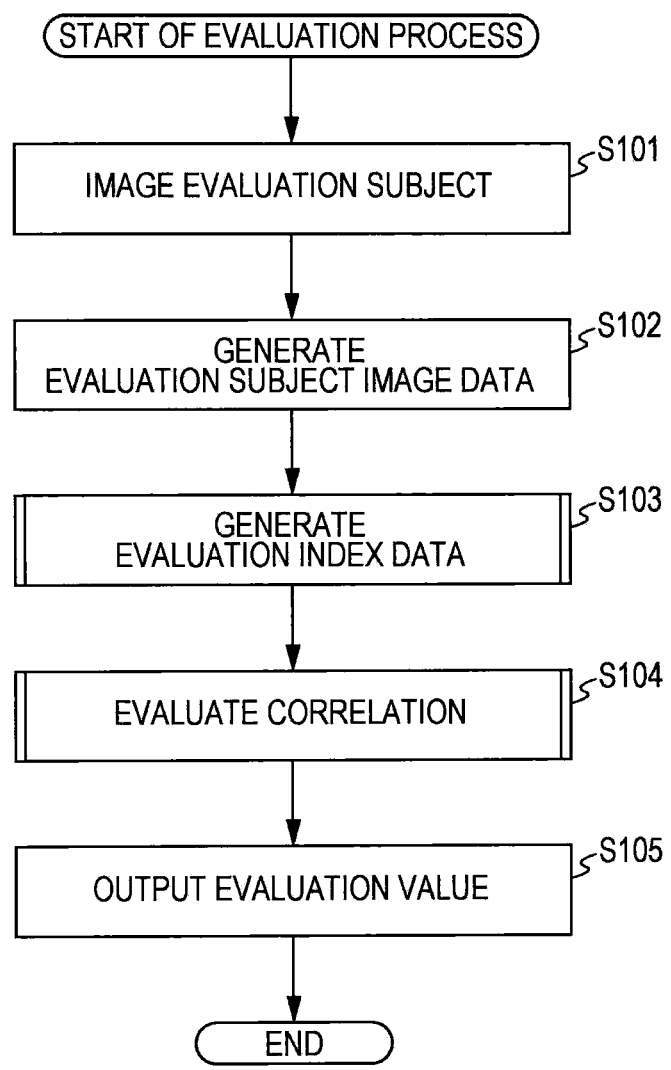

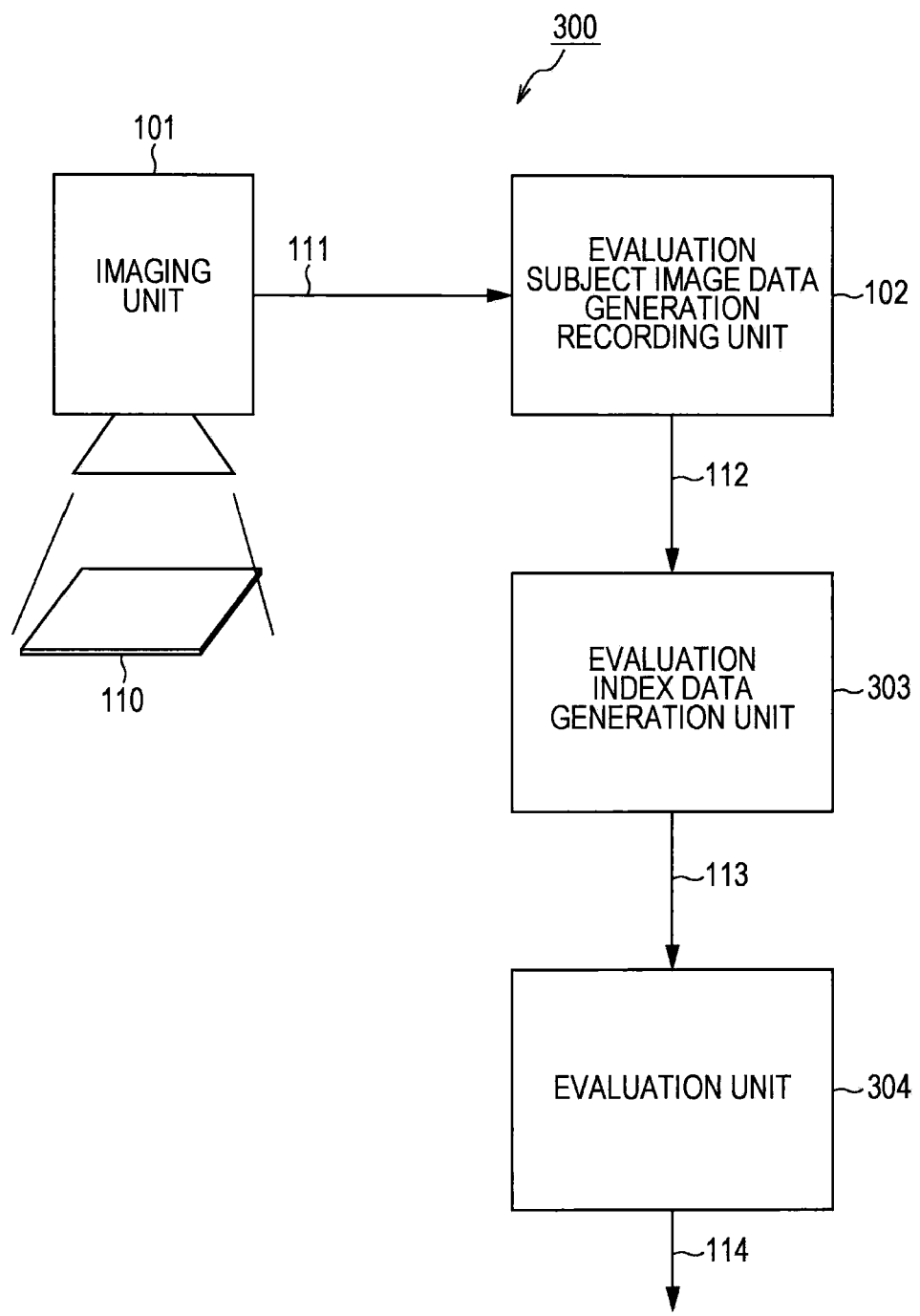

IMAGE PROCESSING APPARATUS, METHOD, AND PROGRAM

BACKGROUND

The present disclosure relates to an image processing apparatus, method, and program, and more particularly, to an image processing apparatus, method, and a program capable of quantitatively evaluating cooperativity of the motion of a subject to be evaluated non-invasively.

In the field of regeneration medicine, the regeneration of cells, tissues, organs, or the like of a body lost due to accident or disease or recovery of the functions thereof are contrived using cultivated cells produced by cultivating cells. There are diverse cell tissues which can be produced as such cultivated cells. Among the cell tissues, cardiac muscle cells are used for treatment of the heart. The cultivated cardiac muscle cells themselves move in accordance with pulsation. Thus, in a step of producing the cultivated cardiac muscle cells, for example, the quality of the cultivated cardiac muscle cells has to be evaluated to decide whether the motion of the cultivated cardiac muscle is satisfactory.

When the quality of the cultivated cardiac muscle cells is evaluated, for example, the current status of the cultivated cardiac muscle cells is observed visually. Further, the quality of the cultivated cardiac muscle cells is evaluated by pricking the cultivated cardiac muscle cells with electrodes and measuring the potential thereof. However, in the visual examination, the subjective view of an examiner may reflect on the evaluation result, and thus it is difficult to accurately obtain evaluation results objectively. When the potential of the cultivated cardiac muscle cells is measured, a problem may arise in that the cultivated cardiac muscle cells have to come into contact with the electrodes and thus the evaluation is not performed non-invasively. Further, information quantified based on the potential measurement is limited to, for example, pulsation time. Furthermore, the measurement subject is limited to a subject measurable with an electrode.

Accordingly, a configuration is disclosed in which measurement points are set in an imaged picture obtained by imaging cardiac muscle cells, the luminances of the measurement points are automatically measured, and the deformation period of the cardiac muscle cells is measured from the measurement values (for example, Japanese Unexamined Patent Application Publication No. 63-233392 (FIG. 1)).

SUMMARY

In the method disclosed in Japanese Unexamined Patent Application Publication No. 63-233392 (FIG. 1), however, there is a concern that a measurable subject is limited to the time interval of a pulsation period since a luminance periodic change is measured. That is, this method is performed non-invasively, but the problem remains in that the quantitatively measurable information is just the pulsation period. Therefore, there is a concern that it is difficult to obtain accurate evaluation results.

For example, when cultivated cardiac muscle cells are evaluated in regeneration medicine or the like, it is preferably evaluated whether the motions of respective portions of the cultivated cardiac muscle cells are cooperating. In the method disclosed in Japanese Unexamined Patent Application Publication No. 63-233392 (FIG. 1), however, there is a concern that it is difficult to quantitatively evaluate the cooperativity of the motion of subject to be evaluated non-invasively.

It is desirable to provide an image processing apparatus, method, and a program capable of quantitatively evaluating the cooperativity of the motions of moving subjects to be evaluated non-invasively.

According to an embodiment of the disclosure, there is provided an image processing apparatus including: a motion detection unit detecting a motion of a subject to be evaluated by using an image of the subject to be evaluated; a correlation calculation unit calculating a temporal change correlation between motion amounts of a plurality of portions of the subject to be evaluated, by using a motion vector indicating the motion of the subject to be evaluated, which is detected by the motion detection unit; and an evaluation value calculation unit calculating an evaluation value to evaluate cooperativity of the motion of the subject to be evaluated by using the correlation calculated by the correlation calculation unit.

The motion detection unit may divide the entire region of the image of the subject to be evaluated into a plurality of partial regions and detects the motions of the respective partial regions. The correlation calculation unit may calculate the correlation between the partial regions using the motion vector calculated for each partial region by the motion detection unit. The evaluation value calculation unit may calculate the evaluation value by using the correlation between the partial regions calculated by the correlation calculation unit.

The evaluation value calculation unit may include a correlation normalization unit normalizing the correlation between the partial regions calculated by the correlation calculation unit to a predetermined function, a distribution calculation unit calculating a time direction distribution of the correlation between the partial regions calculated by the correlation calculation unit, a distribution normalization unit normalizing the distribution calculated by the distribution calculation unit to a predetermined function, and an average/evaluation value calculation unit calculating, as the evaluation value, an average value of products of the correlations between the partial regions normalized by the correlation normalization unit and the distributions normalized by the distribution normalization unit, in the entire image of the subject to be evaluated.

The evaluation value calculation unit may include a correlation normalization unit normalizing the correlation between the partial regions calculated by the correlation calculation unit to a predetermined function, a distribution calculation unit calculating a time direction distribution of the correlation between the partial regions calculated by the correlation calculation unit, a distribution normalization unit normalizing the distribution calculated by the distribution calculation unit to a predetermined function, and an average/evaluation value calculation unit calculating, as the evaluation value, a ratio of the number of products, which are products of the correlations between the partial regions normalized by the correlation normalization unit and the distributions normalized by the distribution normalization unit, having a value larger than a predetermined threshold value to the total number of products.

The evaluation value calculation unit may further include a distance calculation unit calculating a difference between an ideal change, which is an ideal temporal change determined in advance, and a measurement change, which is a temporal change detected by the motion detection unit, in the correlation between the partial regions calculated by the correlation calculation unit, a normalization unit normalizing the differences calculated by the distance calculation unit to a predetermined function, and a difference average value calculation unit calculating, as the evaluation value, an average value of the differences normalized by the normalization unit.

The evaluation value calculation unit may further include a distance calculation unit calculating a difference between an ideal change, which is an ideal temporal change determined in advance, and a measurement change, which is a temporal change detected by the motion detection unit, in the correlation between the partial regions calculated by the correlation calculation unit, a normalization unit normalizing the differences calculated by the distance calculation unit to a predetermined function, and an average/evaluation value calculation unit calculating, as the evaluation value, a ratio of the number of average values, which are average values of the differences normalized by the normalization unit, having a value larger than a predetermined threshold value to the total number of average values.

The correlation calculation unit may calculate the correlation between the partial regions for some or all of the partial regions. The evaluation calculation unit may display a 3D plot by imaging intensities of the correlations between the respective partial regions calculated by the correlation calculation unit in a 3-dimensional space.

The evaluation value calculation unit may calculate the evaluation value so that the cooperativity is higher as the evaluation value is higher.

The evaluation value calculation unit may calculate the evaluation value so that the cooperativity is lower as the evaluation value is lower.

The image processing apparatus may further include an imaging unit obtaining an image of the subject to be evaluated by imaging the subject to be evaluated. The motion detection unit may detect the motion of the subject to be evaluated by using the image of the subject to be evaluated, which is obtained by the imaging unit.

The correlation calculation unit may repeatedly calculate the correlation between the temporal changes in the motion amounts in the plurality of portions of the subject to be evaluated.

The subject to be evaluated may be a cell moving spontaneously.

The subject to be evaluated may be a cultivated cell produced by cultivating a cell picked from a living body.

According to another embodiment of the disclosure, there is provided an image processing method including: detecting, by a motion detection unit of an image processing apparatus, a motion of a subject to be evaluated by using an image of the subject to be evaluated; calculating, by a correlation calculation unit of the image processing apparatus, a temporal change correlation between motion amounts of a plurality of portions of the subject to be evaluated, by using a motion vector indicating the motion of the subject to be evaluated, which is detected by the motion detection unit; and calculating, by an evaluation value calculation unit of the image processing apparatus, an evaluation value to evaluate cooperativity of the motion of the subject to be evaluated, by using the correlation calculated by the correlation calculation unit.

According to still another embodiment of the disclosure, there is provided a program causing a computer to function as: a motion detection unit detecting a motion of a subject to be evaluated by using an image of the subject to be evaluated; a correlation calculation unit calculating a temporal change correlation between motion amounts of a plurality of portions of the subject to be evaluated, by using a motion vector indicating the detected motion of the subject to be evaluated; and an evaluation value calculation unit calculating an evaluation value to evaluate cooperativity of the motion of the subject to be evaluated, by using the calculated correlation.

According to still another embodiment of the disclosure, a motion of a subject to be evaluated is detected by using an image of the subject to be evaluated; a temporal change correlation between motion amounts of a plurality of portions of the subject to be evaluated is calculated by using a motion vector indicating the detected motion of the subject to be evaluated; and an evaluation value is calculated to evaluate cooperativity of the motion of the subject to be evaluated by using the calculated correlation.

According to the embodiments of the disclosure, particularly, the cooperativity of the motion of the subject to be evaluated can quantitatively be evaluated non-invasively.

BRIEF DESCRIPTION OF THE DRAWINGS

FIGS. 2A and 2B are diagrams of the cooperativity of the motion;
FIG. 3 is a block diagram of an example of the main configuration of a cultivated cardiac muscle cell evaluation apparatus;
FIG. 14 is a flowchart of an example of the flow of an evaluation process;
FIG. 20 is a block diagram of an example of the main configuration of a medicine evaluation apparatus.

DETAILED DESCRIPTION OF EMBODIMENTS

Hereinafter, modes for carrying out the disclosure (hereinafter, referred to as embodiments) will be described.

The description will be made in the following order.
1. First Embodiment (Cultivated Cardiac Muscle Cell Evaluation Apparatus)
2. Second Embodiment (Cultivated Cardiac Muscle Cell Evaluation Apparatus)
3. Third Embodiment (Medicine Evaluation Apparatus)
4. Fourth Embodiment (Personal Computer)

1. First Embodiment

Cooperativity of Motion

Figure 1A:
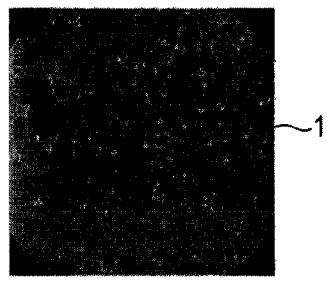
FIGS. 1A to 1C are diagrams of cooperativity of a motion.

First, cooperativity of the motion of a subject to be evaluated will be described. For example, in regeneration medicine, various tissues, organs, or the like of a human body are remedied using cultivated cells. The cultivated cells are cell tissues produced by cultivating cells. Cultivated cells 1 shown in FIG. 1A are cells which are cultivated and grow. For example, cultivated cardiac muscle cells which are cells produced by cultivating cardiac muscle cells are used for treatment of the heart or the like.

In recent years, technical development is in progress to produce the cultivated cells 1 in large quantities and to supply the sufficient amount of cultivated cells to clinical practices at low cost. When the cultivated cells are produced in large quantities, it is necessary to efficiently evaluate the produced cells with accuracy.

Figure 1B:
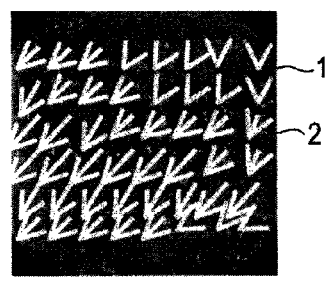

The cultivated cells 1 are produced by cultivating the cardiac muscle cells picked from a living body. When the cardiac muscle cells 1 (cultivated cardiac muscle cells) are produced as the cultivated cells, the cardiac muscle cells pulsate while being normally contracted and relaxed repeatedly. In this case, the motion of cardiac muscle cells of the cultivated cells 1 is evaluated to evaluate the performance of the cultivated cells 1. The entire cultivated cells 1 as the cultivated cardiac muscle cells are contracted and relaxed repeatedly. For example, as shown in FIG. 1B, the cells of respective portions move in a predetermined like a motion vector 2.

Figure 1C:
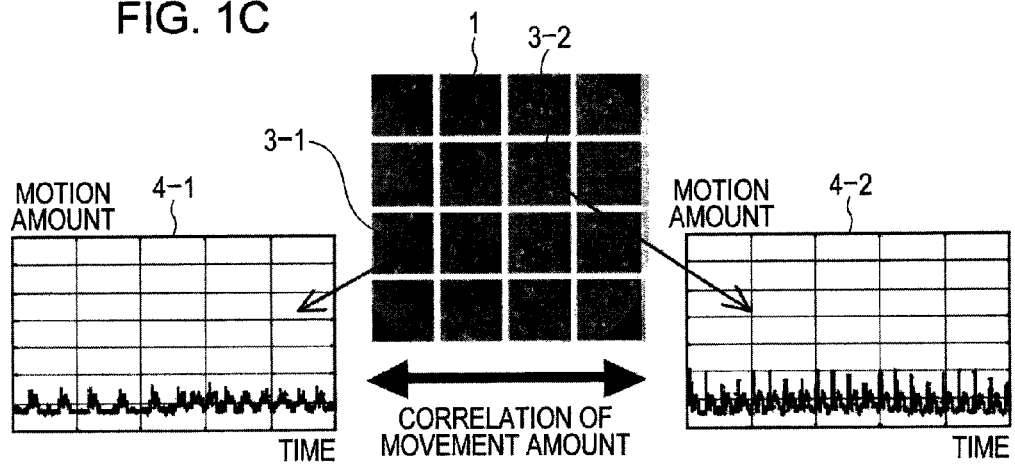

An observation region of the cultivated cells 1 is divided into a plurality of partial regions (blocks), as shown in FIG. 1C. The motion amount (motion vector) in each block is detected to examine the temporal change.

For example, a graph 4-1 shown in FIG. 1C shows a temporal change in the motion amount in a block 3-1. A graph 4-2 shows a temporal change in the motion amount in a block 3-2. The correlation (cooperativity) between the motions of the cells in the blocks is evaluated.

Graphs 5-1 to 5-3 shown in FIG. 2A show the temporal change in the relationship between the motion amount of the cells in the block 3-1 shown in the graph 4-1 and the motion amount of the cells in the block 3-2 shown in the graph 4-2.

The motion amount of the cells present in the block 3-1 and the motion amount of the cells present in the block 3-2, which are first picked from the living body, have low correlation, as shown in the graph 5-1. However, when the cells are cultivated over time, the correlation between the motion amounts gradually becomes strong, as shown in the graph 5-2. When the time passes, the correlation between the motion amounts become very strong, as shown in the graph 5-3.

That is, a correlation coefficient of the motion amount at a plurality of locations of the cultivated cells 1 gradually increases and is stabilized, as shown in the graph of FIG. 2B. That is, the cooperativity of the motions of the cells at each region becomes strong. Ideally, the motions of the respective cells are correlated mutually and the entire cultivated cells 1 are pulsated as a single living tissue.

On the other hand, when the cells are not well cultivated and the performance of the cultivated cells 1 is unstable, the cooperativity of the cells of the receptive portions is not improved, the pulsation is weak, the respective portions moves in a scattered state or do not move.

That is, the evaluation of the cooperativity of the motions of the respective portions of the cultivated cells 1 may be established as one method of evaluating the performance of the cultivated cells 1. The cultivated cells can be evaluated quantitatively appropriately by calculating the strong and weak extent of the cooperativity as an evaluation value.

Cultivated Cardiac Muscle Cell Evaluation Apparatus

FIG. 3 is a block diagram of an example of the main configuration of the cultivated cardiac cell evaluation apparatus.

A cultivated cardiac cell evaluation apparatus 100 shown in FIG. 3 is an apparatus that evaluates the cooperativity of the motions of cultivated cardiac muscle cells 110. As shown in FIG. 3, the cultivated cardiac cell evaluation apparatus 100 includes an imaging unit 101, an evaluation subject image data generation recording unit 102, an evaluation index data generation unit 103, and an evaluation unit 104.

The imaging unit 101 images the cultivated cardiac muscle cells 110 which are a subject to be evaluated. The imaging unit 101 may directly image the cultivated cardiac muscle cells 110 (without using another member) or may image the cultivated cardiac muscle cells 110 using another member such as a microscope.

The cultivated cardiac muscle cells 110 may be fixed with respect to the imaging unit 101 or may not be fixed. The cultivated cardiac muscle cells 110 are preferably fixed with respect to the imaging unit 101 so that the cultivated cardiac cell evaluation apparatus 100 detects motions (temporal change in its positions).

The imaging unit 101 supplies the evaluation subject image data generation recording unit 102 with an image signal of an image of the cultivated cardiac muscle cells 110 obtained through the imaging.

The evaluation subject image data generation recording unit 102 generates evaluation subject image data based on the image signal supplied from the imaging unit 101 and stores the generated evaluation subject image data in, for example, an internal recording medium. The generated evaluation subject image data is moving image data generated based on the image signal obtained by imaging the cultivated cardiac muscle cells 110.

For example, the evaluation subject image data generation recording unit 102 may extract only a frame image of a given period among a plurality of frame images supplied from the imaging unit 101 and set the extracted frame image as the evaluation subject image data. For example, the evaluation subject image data generation recording unit 102 may extract a partial region of each of the frame images supplied from the imaging unit 101 and may set a moving image formed by the partial frame images as the evaluation subject image data. For example, the evaluation subject image data generation recording unit 102 performs any image processing on each of the frame images supplied from the imaging unit 101 and may set the image processing result as the evaluation subject image data. As the image processing, for example, expansion, reduction, rotation, deformation of an image, correction of luminance or chromaticity, sharpness, noise removal, and generation of an intermediate frame image may be used. Of course, other image processing may be performed.

The evaluation subject image data generation recording unit 102 supplies the stored evaluation subject image data to the evaluation index data generation unit 103 at a predetermined timing.

The evaluation index data generation unit 103 detects the motion of the subject (the cultivated cardiac muscle cells 110) to be evaluated on each block, which is each of a plurality of partial regions divided from the entire region of the image of the subject (the cultivated cardiac muscle cells 110) to be evaluated, in each frame image of the supplied evaluation subject image data.

The evaluation index data generation unit 103 expresses the detected motions of the respective blocks as a motion vector and calculates correlation of the motions of the respective blocks of the subject (the cultivated cardiac muscle cells 110) to be evaluated. Further, the evaluation index data generation unit 103 generates evaluation index data which is an index used to evaluate the cooperativity of the motions of the respective blocks based on the correlation of the motions.

The evaluation index data generation unit 103 supplies the generated evaluation index data to the evaluation unit 104.

The evaluation unit 104 calculates the supplied evaluation index data to calculate an evaluation value 114 of the cooperativity between the motions of the cultivated cardiac muscle cells 110 and outputs the evaluation value 114.

The subject to be evaluated by the cultivated cardiac cell evaluation apparatus 100 may be a subject other than the cultivated cardiac muscle cells 110. For example, a cell sheet of cells other than the cardiac cells may be a subject to be evaluated. Of course, the subject to be evaluated may be a subject other than cells. However, the subject to be evaluated is preferably a subject which can move and can be evaluated by the evaluation of the cooperativity of the motions. The motion may be autonomous (self-active) like the motion of cardiac muscle cells or may be made by an electric signal supplied from the outside.

Evaluation Index Data Generation Unit

Figure 4:
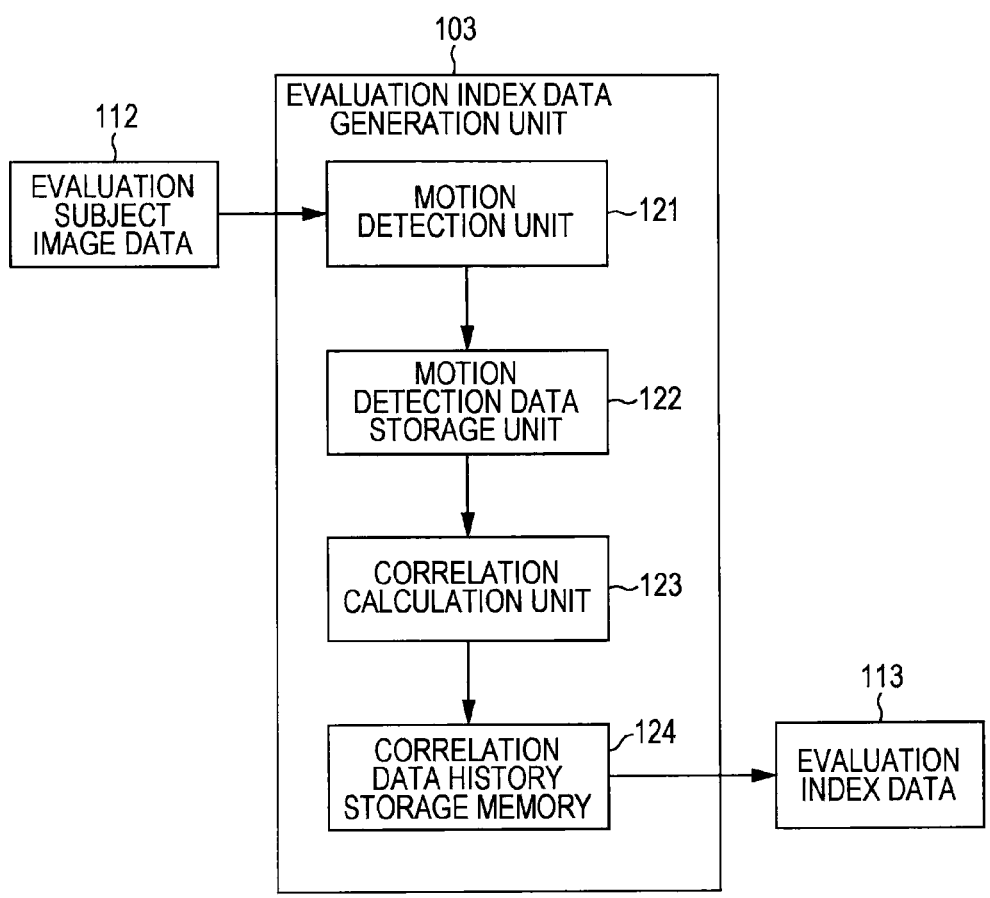
FIG. 4 is a block diagram of an example of the main configuration of an evaluation index data generation unit.

FIG. 4 is a block diagram of an example of the main configuration of the evaluation index data generation unit 103 in FIGS. 1A to 1C. As shown in FIG. 4, the evaluation index data generation unit 103 includes a motion detection unit 121, a motion detection data storage unit 122, a correlation calculation unit 123, and a correlation data history storage memory 124.

The motion detection unit 121 inputs evaluation subject image data 112 recorded by the evaluation subject image data generation recording unit 102, detects the motions of the respective blocks, and supplies and stores the detection result (motion vector) as motion detection data in the motion detection data storage unit 122.

The correlation calculation unit 123 calculates a correlation coefficient of the motions of the blocks using the motion detection data stored in the motion detection data storage unit 122, and then supplies and stores the correlation coefficient as correlation data in the correlation data history storage memory 124.

The correlation data history storage memory 124 retains the calculated coefficients as the correlation data while the correlation coefficients are calculated repeatedly a predetermined number of times. The correlation data history storage memory 124 supplies the retained correlation data as evaluation index data 113 to the evaluation unit 104 at a predetermined timing.

Structure of Evaluation Subject Image Data

Figure 5:
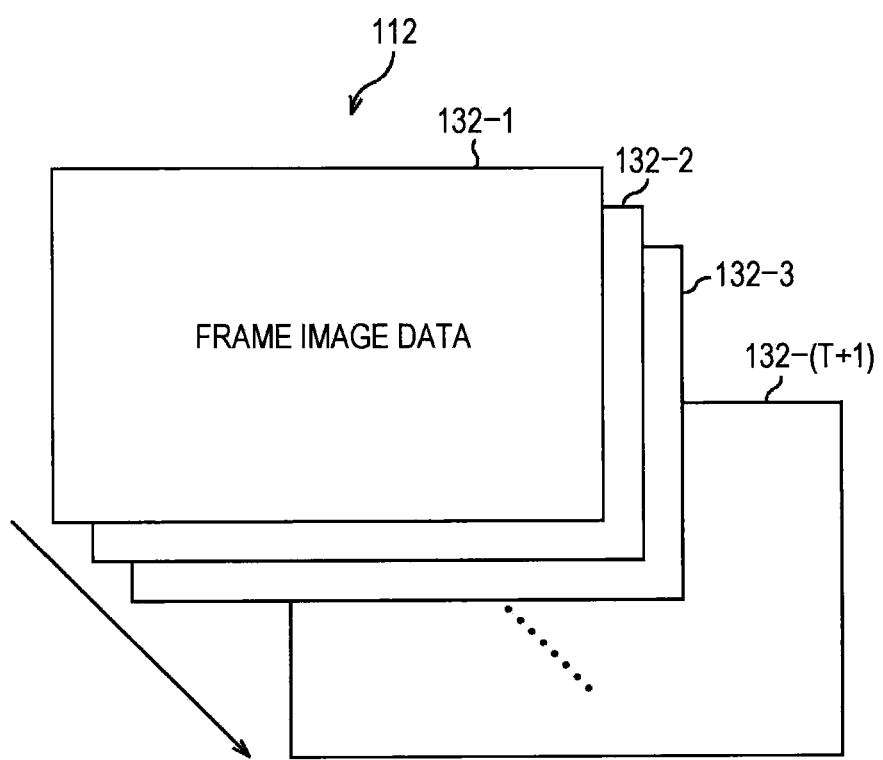
FIG. 5 is a diagram of an example of the structure of evaluation subject image data.

FIG. 5 is a diagram of an example of the structure of the evaluation subject image data 112 supplied to the evaluation index data generation unit 103. The cooperativity of the motions is evaluated at an evaluation interval (for example, a T+1 frame (where T is any natural number) of a predetermined length. Accordingly, the evaluation subject image data 112 supplied to the evaluation index data generation unit 103 is formed by first frame image data 132-1 to (T+1)-th frame image data 132-(T+1) corresponding to the evaluation interval.

Example of Configuration of Motion Detection Unit

Figure 6:
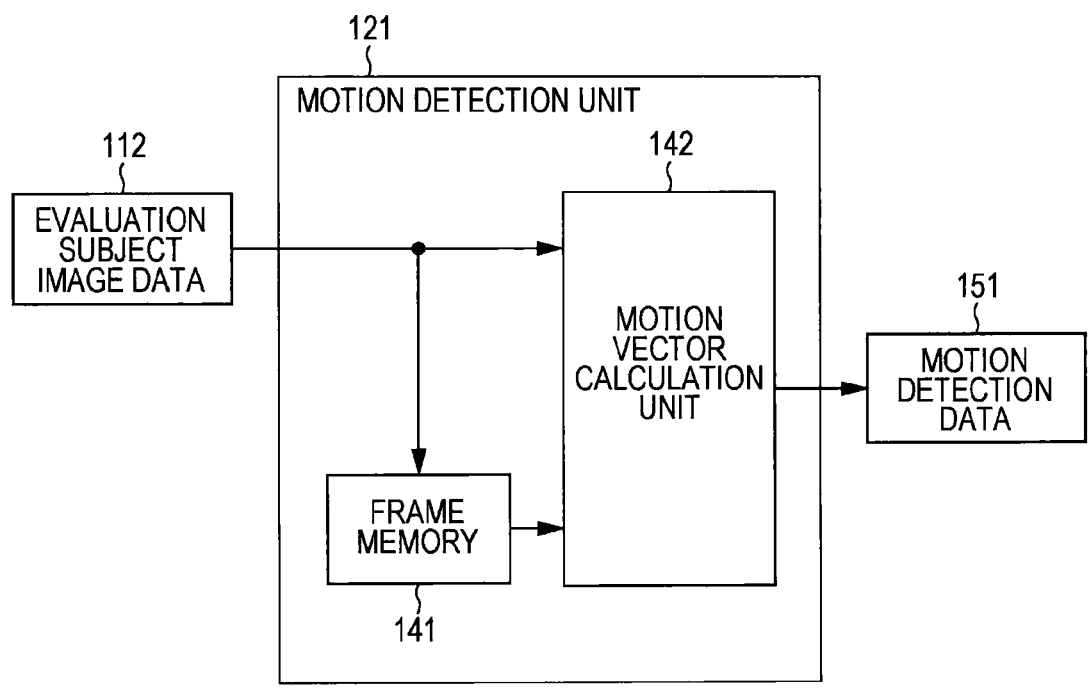
FIG. 6 is a block diagram of an example of the main configuration of a motion detection unit.

FIG. 6 is a block diagram of an example of the main configuration of the motion detection unit 121. As shown in FIG. 6, the motion detection unit 121 includes a frame memory 141 and a motion vector calculation unit 142. The frame memory 141 retains frame image data 132 sequentially input as the evaluation target image data 112 during each frame period.

The motion vector calculation unit 142 inputs the frame image data input as the evaluation subject image data 112 of the current time and the frame image data retained in the frame memory 141 of an immediately previous time (temporally previous time). Then, the motion vector calculation unit 142 calculates the motion vector indicating the motion between two pieces of frame image data for each block. The calculated motion vector is retained as motion detection data 151 in the motion detection data storage unit 122.

Figure 7:
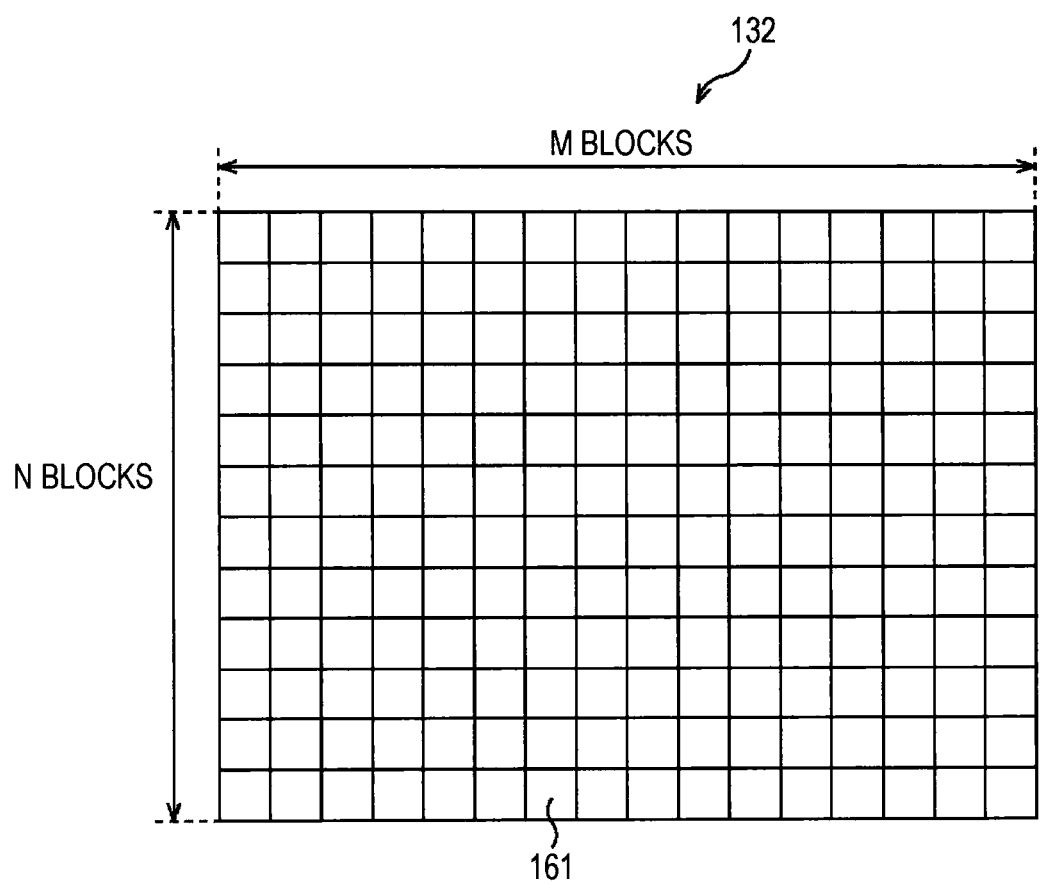
FIG. 7 is diagram of an example of block division of frame image data.

The processing performed by the motion detection unit 121 in FIG. 6 will be described in more detail. The motion vector calculation unit 142 inputs the frame image data 132 of the current time and the frame image data 132 of the immediately previous time (temporally previous time). The motion vector calculation unit 142 divides the input frame image data 132 into M×N (where M and N are any natural number) blocks 161, as shown in FIG. 7. Then, the motion vector calculation unit 142 generates a motion vector by detecting the motions of the respective blocks 161 through a method such as block matching between the frame images. Each block 161 is formed by, for example, (16×16) pixels.

The motion vector calculation unit 142 performs the motion detection process using the first frame image data 132 to the (T+1) frame image data 132 in sequence. That is, the motion vector calculation unit 142 generates the (M×N×T) motion detection data (motion vector) using the (T+1) frame images. The motion vector calculation unit 142 supplies and stores the motion vector calculated in this way as the motion detection data in the storage unit 122.

Figure 8:
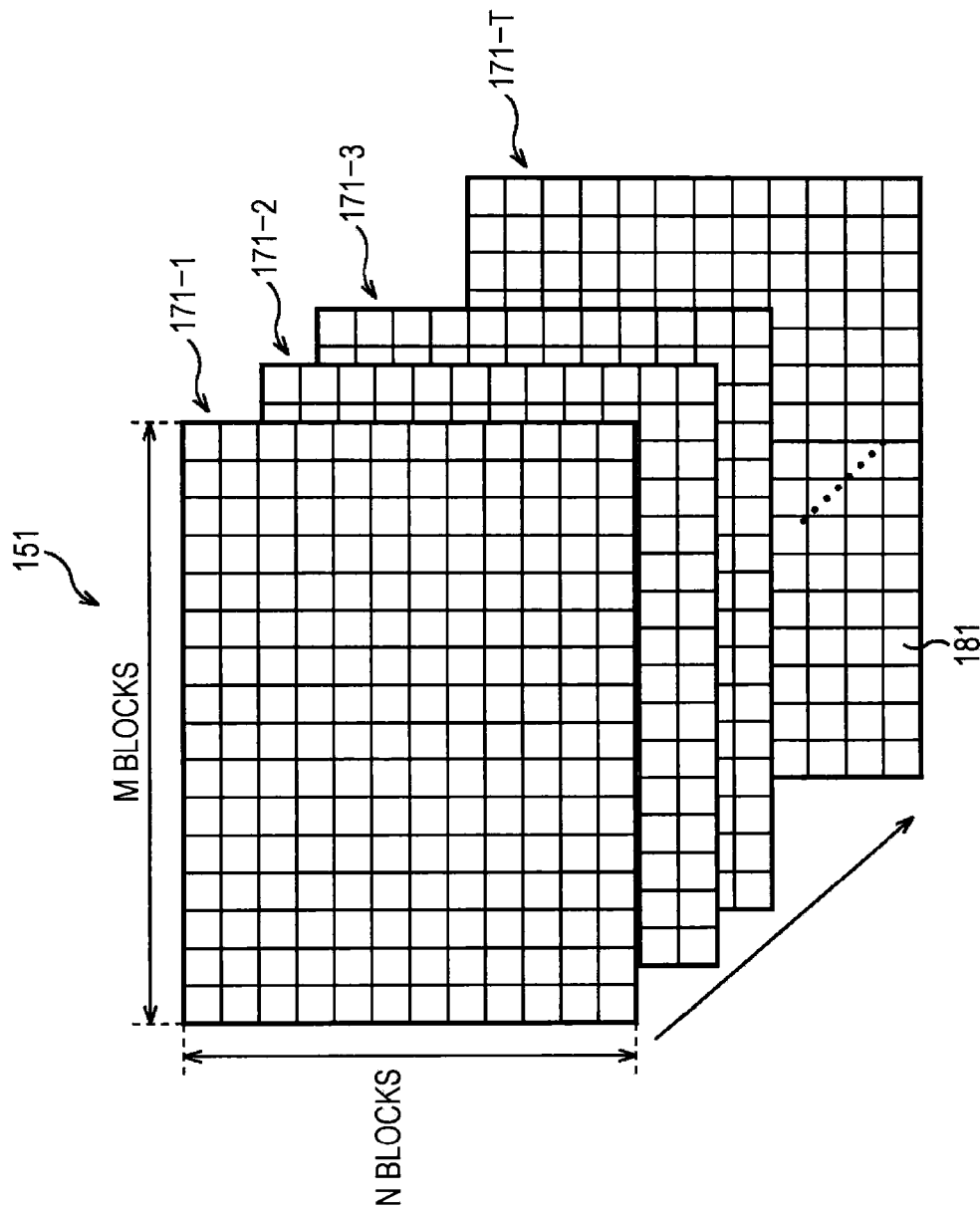
FIG. 8 is a diagram of an example of the configuration of motion detection data.

When the final motion detection process is completed using the T-th frame image data 132 and the (T+1)-th frame image data 132, the motion detection data storage unit 122 stores the motion detection data formed by T frame unit motion detection data 171-1 to 171-T, as shown in FIG. 8.

Each of the frame unit motion detection data 171-1 to 171-T is obtained by performing the motion detection process on the frame image data 132 of the current time and the frame image data 132 of the immediately previous time (temporally previous time) which can be obtained during each frame period.

For example, the third frame unit motion detection data 171-3 can be obtained by inputting the fourth frame image data 132-4 and the third frame image data 132-3 as the frame image data of the current time and the immediately previous time and performing the motion detection process.

Each of the frame unit motion detection data 171-1 to 171-T is formed by (M×N) block unit motion detection data 181. Each of the block unit motion detection data 181 is data which corresponds to one block 161 and indicates the motion vector detected for the corresponding block 161.

The motion detection data 151 according to the embodiment has a structure in which each of the frame unit motion detection data 171 has the (M×N) block unit motion detection data 181.

Correlation Calculation Unit

Figure 9:
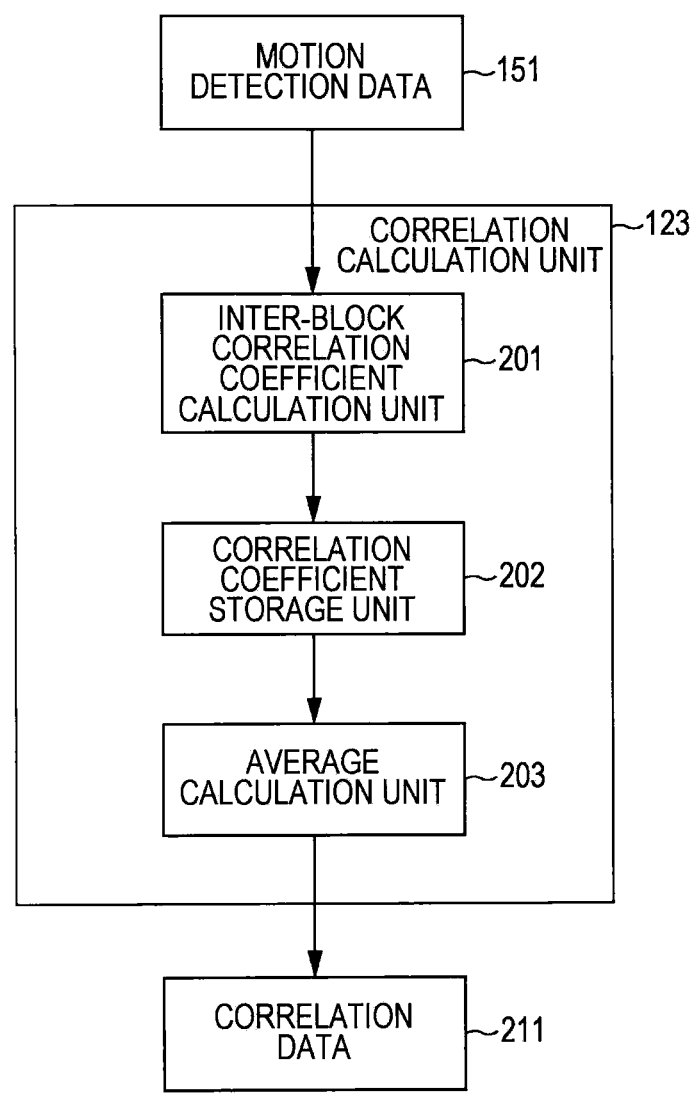
FIG. 9 is a block diagram of an example of the main configuration of a correlation calculation unit.

FIG. 9 is a block diagram of an example of the main configuration of the correlation calculation unit 123 in FIG. 4. As shown in FIG. 9, the correlation calculation unit 123 includes an inter-block correlation coefficient calculation unit 201, a correlation coefficient storage unit 202, and an average calculation unit 203.

The inter-block correlation coefficient calculation unit 201 calculates a correlation coefficient C of the motion between the blocks using the motion detection data 151 corresponding to one evaluation interval read from the motion detection data storage unit 122. For example, the an inter-block correlation coefficient calculation unit 201 calculates a correlation coefficient $C_{a,b}$ between blocks A and B is calculated, as in Expression (1) below.

$$C_{a,b} = \frac{\sum_{i=0}^{T-1}\{V_a(k) - \overline{V_a}(k)\}\{V_b(k) - \overline{V_b}(k)\}}{\sqrt{\sum_{k=0}^{T-1}\{V_a(k) - \overline{V_a}(k)\}^2}\sqrt{\sum_{k=0}^{T-1}\{V_b(k) - \overline{V_b}(k)\}^2}} \quad (1)$$

In Expression (1), Va(k) denotes the motion amount of the block A of a frame at a time k. Further, Va(k) lined on its top denotes an average value of the motion amount of the block A in a time-series direction within the evaluation interval. Vb(k) denotes the motion amounts of the blocks B of a frame at a time k. Further, Vb(k) lined on its top denotes an average value of the motion amounts of the blocks B in a time-series direction within the evaluation interval.

Figure 10:
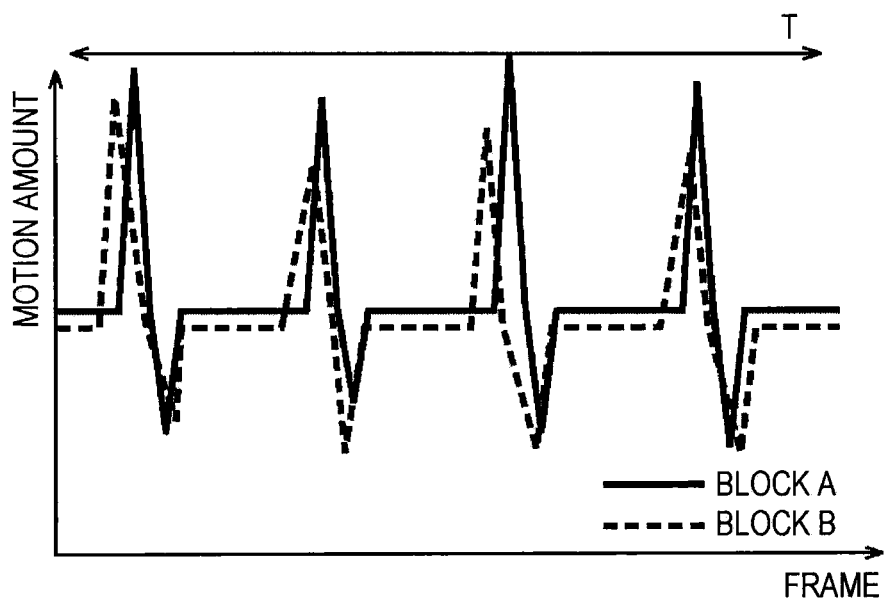
FIG. 10 is a diagram of correlation between motion amounts.

That is, the an inter-block correlation coefficient calculation unit 201 calculates an extent of the correlation of the shape of the motion amount within the evaluation interval between two blocks, as shown in FIG. 10.

The inter-block correlation coefficient calculation unit 201 calculates correlation coefficients C between all of the blocks (combination of all the blocks). For example, when the an inter-block correlation coefficient calculation unit 201 calculates the L correlation coefficients $C_{a,b}$, L is calculated, as in Expression (2) below.

$$L = \frac{1}{2}MN(MN-1). \quad (2)$$

The correlation coefficient storage unit 202 stores the L correlation coefficients $C_{a,b}$ calculated by the an inter-block correlation coefficient calculation unit 201.

The average calculation unit 203 calculates an average correlation coefficient Cave which is an average of the calculated correlation coefficients between the blocks, as in Expression (3) below.

$$C_{ave} = \frac{1}{L}\sum_{k=0}^{L-1} C(k) \quad (3)$$

Figure 11:
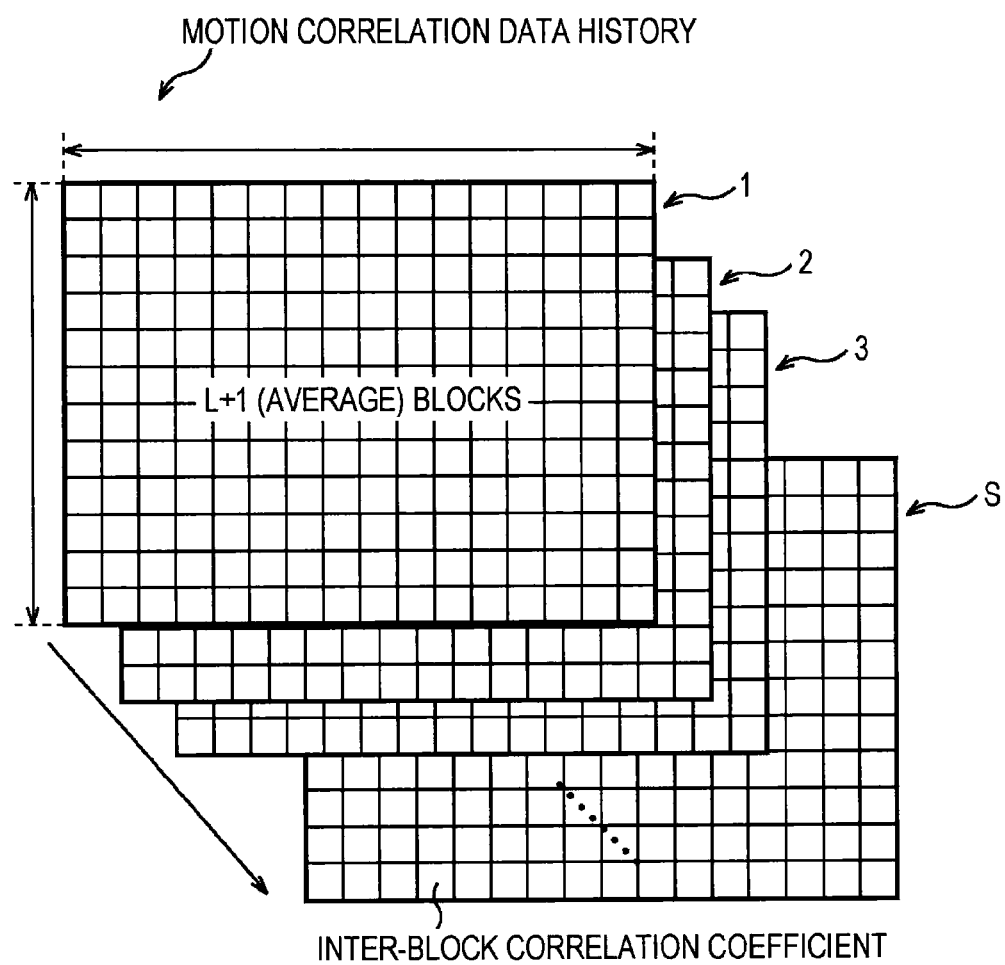
FIG. 11 is a diagram of an example of the configuration of a motion correlation data history.

The average calculation unit 203 supplies and stores, as correlation data 211, the respective correlation coefficients $C_{a,b}$ calculated by the an inter-block correlation coefficient calculation unit 201 and the average correlation coefficient Cave calculated by the average calculation unit 203 in the correlation data history storage memory 124. That is, as shown in FIG. 11, (L+1) pieces of correlation data 211 of one evaluation interval are stored in the correlation data history storage memory 124.

The evaluation index data generation unit 103 repeats the process of generating the evaluation index data a predetermined number of times (for example, S number of times (where S is any natural number)). That is, the imaging unit 101 generates the frame images corresponding to at least (the evaluation intervals (T+1 frames)×S number of times) by continuing the imaging. The evaluation subject image data generation recording unit 102 generates the evaluation subject image data corresponding to at least (the evaluation intervals×S number of times). In the evaluation subject image data, the respective evaluation interval may not continue temporally.

For example, a period from the start of the cultivation to the end of the cultivation is set to 10 days and T=600 frames are imaged for two hours for the evaluation. In this case, each evaluation interval corresponds to 600 frames and the evaluation interval is repeated by S=120 number of times.

The correlation calculation unit 123 generates the correlation data 211 for each evaluation interval, as described above. Thus, (L+1)×S pieces of correlation data 211 are stored in the correlation data history storage memory 124, as shown in FIG. 11.

Evaluation Unit

The correlation data 211 corresponding to the S evaluation intervals stored in the correlation data history storage memory 124 are supplied as the evaluation index data 113 to the evaluation unit 104.

Figure 12:
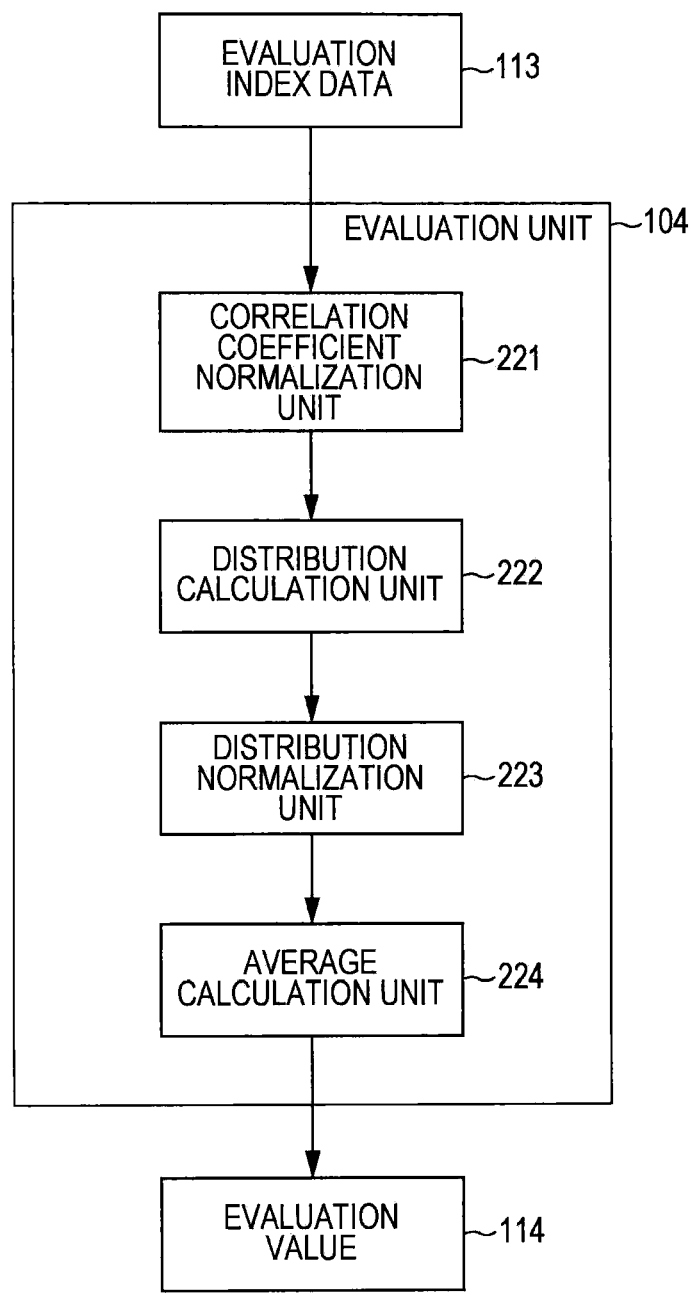
FIG. 12 is a block diagram of an example of the configuration of evaluation unit.

FIG. 12 is a block diagram of an example of the main configuration of the evaluation unit 104. As shown in FIG. 12, the evaluation unit 104 includes a correlation coefficient normalization unit 221, a distribution calculation unit 222, a distribution normalization unit 223, and an evaluation value calculation unit 224.

Figure 13A:
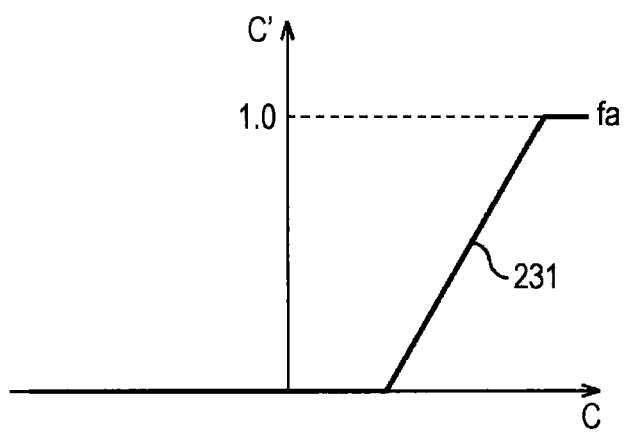
FIGS. 13A and 13B are diagrams of examples of a normalization function.

The correlation coefficient normalization unit 221 normalizes each correlation coefficient $C_{a,b}$, which is the evaluation index data 113, using a function fc such as a curve 231 in a graph shown in FIG. 13A, as in Expression (4) below (calculates a correlation coefficient C' normalized by the function fc).

$$C' = f_c(C) \quad (4)$$

For example, when the L correlation coefficients $C_{a,b}$ are calculated, the correlation coefficient normalization unit 221 normalizes each of the L correlation coefficients $C_{a,b}$ using the function fc.

The function fc may be any function, as long as the function fc can be made to be larger as the value of the correlation coefficient $C_{a,b}$ is larger, whereas the function fc can be made to be smaller as the value of the correlation coefficient $C_{a,b}$ is smaller. That is, the normalized correlation coefficient C' has a larger value as the correlation between the motion amounts of the blocks is higher, whereas having a smaller value as the correlation between the motion amounts of the blocks is lower.

The correlation coefficient normalization unit 221 supplies the normalized correlation coefficient C' and the normalized correlation coefficient $C_{a,b}$ to the distribution calculation unit 222.

The distribution calculation unit 222 calculates a previous N-th distribution Vc for the correlation coefficient $C_{a,b}$, as in Expression (5) below.

$$V_c = \frac{1}{N}\sum_{k=0}^{N-1}(\overline{C} - C(t-k))^2 \quad (5)$$

In Expression (5), C lined on its top is an average value of the correlation coefficients $C_{a,b}$ in the time axis direction within the evaluation interval. As described above, when the calculation of the correlation coefficient $C_{a,b}$ the S number of times, a relation of "N=S" is satisfied. That is, the distribution calculation unit 222 calculates L distributions Vc of the correlation coefficient in all the frame images. The distribution calculation unit 222 supplies the distribution normalization unit 223 with the calculated distributions Vc of the correlation coefficients and a correlation coefficient C'.

Figure 13B:
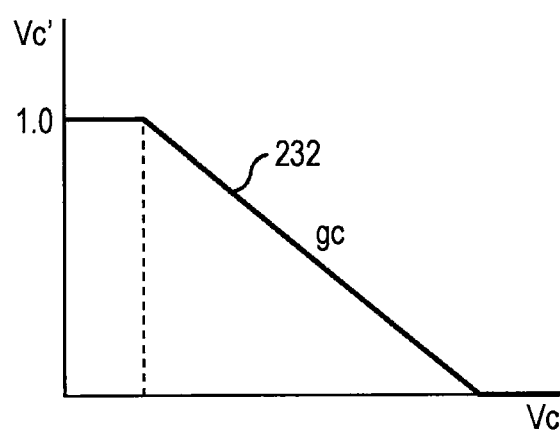

The distribution normalization unit 223 normalizes the distribution Vc of each correlation coefficient using a function gc such as a curve 232 in a graph shown in FIG. 13B, as in Expression (6) below (calculates a distribution Vc' of the correlation coefficient normalized by the function gc).

$$V'_c = g_c(V_c) \quad (6)$$

The function gc may be any function, as long as the function gc can be made to be smaller as the value of the distribution Vc of the correlation coefficient is larger, whereas the function gc can be made to be larger as the value of the distribution Vc of the correlation coefficient is smaller. That is, the distribution Vc' of the normalized correlation coefficient has a larger value as a variation is smaller, whereas having a smaller value as the variation is larger.

The distribution normalization unit 223 supplies the evaluation value calculation unit 224 with the distribution Vc' of the normalized correlation coefficient and the normalized correlation coefficient C'.

The evaluation value calculation unit 224 calculates, as evaluation values Ec, average values (L average values) of the products of the normalized correlation coefficients C' and the distributions Vc' of the normalized correlation coefficients in the entire picture, as in Expression (7) below.

$$E_c = \frac{1}{L}\sum_{k=0}^{L-1}C_k V'_k \quad (7)$$

In this case, the evaluation Ec is larger as the normalized correlation coefficient and the distribution of the normalized correlation coefficient are larger. That is, the evaluation Ec is evaluated higher as the correlation coefficient between the respective blocks is high and stable (the correlation is larger and the variation in the time direction is smaller).

The evaluation value calculation unit 224 may calculate, as the evaluation value Ec, a ratio of the number Nc1 of correlation coefficients, in which the value of the product of the normalized correlation coefficient C' and the distribution Vc' of the normalized correlation coefficients is larger than a predetermined threshold value Tc1, to all the frame images (L frame images), as in Expression (8) below.

$$E_c = \frac{N_{c1}}{L} \quad (8)$$

The threshold value Ta1 is any value determined in advance. As the threshold value Ta1 is set to be larger, an evaluation reference is higher (the evaluation condition is more strict). Therefore, the evaluation value Ec is smaller. In this case, the evaluation value Ec is larger as the number of correlation coefficients is larger in which the product of the normalized correlation coefficient and the time direction distribution is larger and stable more than a predetermined reference.

That is, in this case, the variation in the respective correlation coefficients is preferably smaller, compared to the case where the evaluation value Ec is calculated using the average value, as described above. For example, when the average value is evaluated, the evaluation is sometimes high in spites of the fact that the variation in the respective correlation coefficients is large. However, when the evaluation is performed using the threshold value, the evaluation is not high in a case where the number Nc1 of correlation coefficients is large in spite of the fact that the value of some correlation coefficient is very large.

As described above, only the correlation coefficient $C_{a,b}$ between two blocks is evaluated, but the embodiment of disclosure is not limited thereto. The evaluation unit 104 may evaluate also the average correlation coefficient Cave calculated by the average calculation unit 203. In this case, the evaluation unit 104 evaluates the average correlation coefficient Cave like the above-described correlation coefficient $C_{a,b}$.

That is, in this case, the evaluation value calculation unit 224 calculates, the evaluation value Ec, an average of (L+1) products of the normalized correlation coefficients C' and the distributions V' of the normalized correlation coefficients. Alternatively, the evaluation value calculation unit 224 calculates, the evaluation value Ec, a ratio of the number Nc1 of correlation coefficients, in which the value of the product of the normalized correlation coefficient C' and the distribution Vc' of the normalized correlation coefficient is equal to or greater than the threshold value Tc1, to all of the frame images ((L+1) frame images).

In this way, the evaluation unit 104 calculates the evaluation value Ec so that the evaluation value Ec is larger as the cooperativity of the pulsations (motions) of the respective portions of the cultivated cardiac muscle cells 110 is high, whereas the evaluation value Ec is smaller as the cooperativity of the pulsations (motions) of the respective portions of the cultivated cardiac muscle cells 110 is low. Thus, the cultivated cardiac muscle evaluation apparatus 100 (the evaluation unit 104) can quantitatively evaluate the cooperativity of the pulsations (motions) of the respective portions of the cultivated cardiac muscle cells 110. Further, the cultivated cardiac muscle evaluation apparatus 100 can evaluate the cultivated cardiac muscle cells easily and non-invasively by using the motion vectors of the respective portions of the cultivated cardiac muscle cells 110, which are detected using the image data obtained through the imaging of the cultivated cardiac muscle cells 110, as the index used to calculate the evaluation value.

Flow of Evaluation Process

Next, an example of the flow of the evaluation process performed by the cultivated cardiac muscle evaluation apparatus 100 will be described with reference to the flowchart of FIG. 14.

When the evaluation process starts, the imaging unit 101 of the cultivated cardiac muscle evaluation apparatus 100 images a subject to be evaluated in step S101. In step S102, the evaluation subject image data generation recording unit 102 generates the evaluation subject image data from the image signal obtained through the imaging of step S101.

In step S103, the evaluation index data generation unit 103 generates the evaluation index data, which is the data of the index used to evaluate the cooperativity of the motions of the subject to be evaluated, from the evaluation subject image data generated in step S102. In step S104, the evaluation unit 104 evaluates the correlation, that is, the cooperativity between the motions of the blocks of the subject to be evaluated by using the evaluation index data generated in step S103 and calculates the evaluation value.

In step S105, the evaluation unit 104 outputs the evaluation value calculated in step S104. Then, the evaluation process ends.

Flow of Process of Generating Evaluation Index Data

Figure 15:
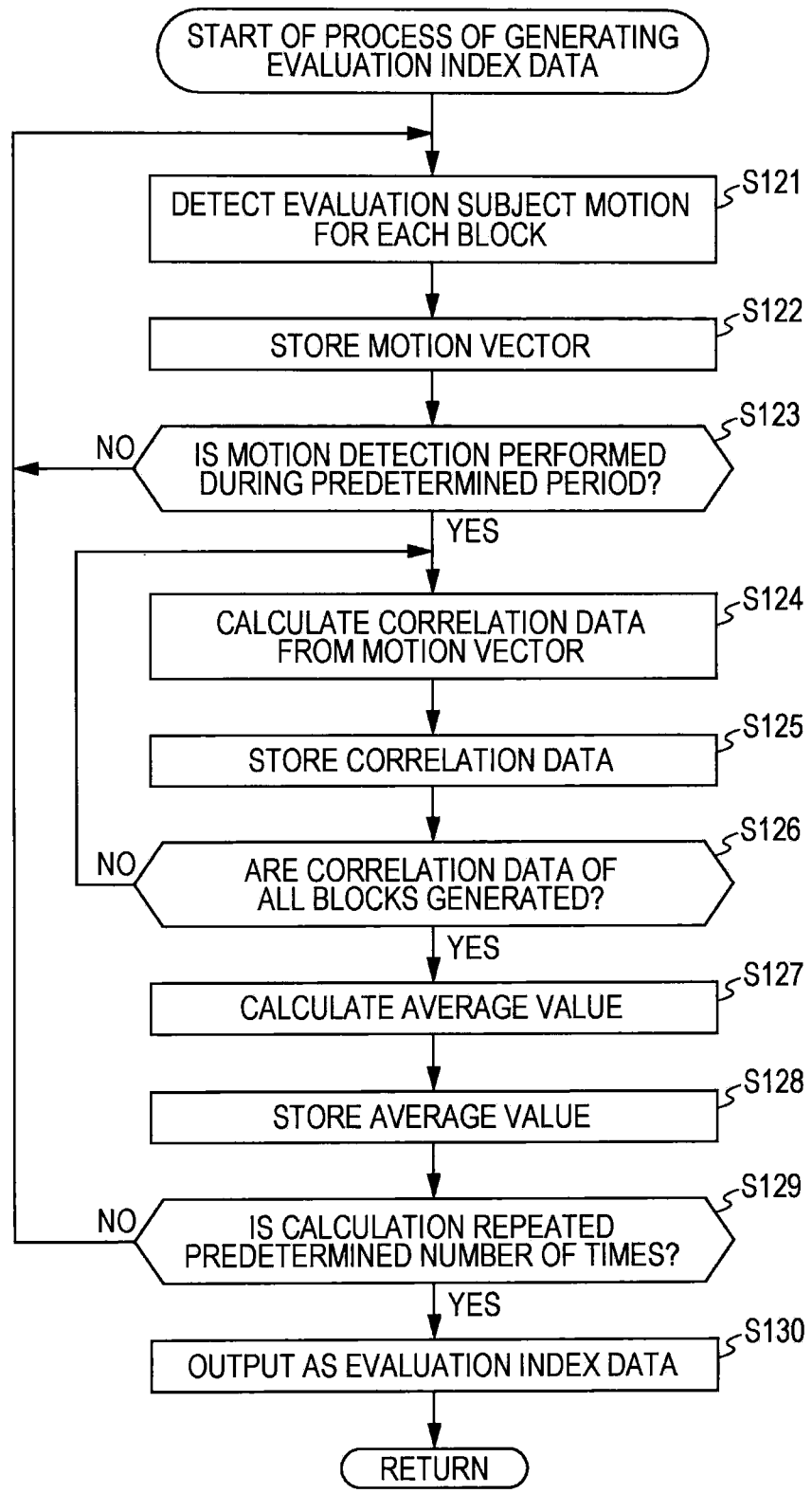
FIG. 15 is a flowchart of an example of the flow of an evaluation index data generation process.

Next, an example of the flow of the process of generating the evaluation index data in step S103 of FIG. 14 will be described with reference to the flowchart of FIG. 15.

When the process of generating the evaluation index data starts, the motion detection unit 121 of the evaluation index data generation unit 103 detects the motion of the subject to be evaluated in step S121 for each block and generates the motion vector. In step S122, the motion detection data storage unit 122 stores the motion vector of each block generated in step S121.

In step S123, the motion detection unit 121 determines whether to perform the motion detection during a predetermined period (evaluation interval). When the motion detection unit 121 determines that there is the frame image for which the motion detection is not performed, the motion detection unit 121 returns the process to step S121 and reiterates the motion detection on the frame image to be newly processed.

When the motion detection unit 121 determines that the motion detection is performed on all of the frame images to be processed during the predetermined evaluation interval in step S123, the motion detection unit 121 allows the process to proceed to step S124.

In step S124, the inter-block correlation coefficient calculation unit 201 of the correlation calculation unit 123 calculates the correlation coefficient between the respective blocks from the motion vectors (motion detection data) stored in step S122. In step S125, the correlation coefficient storage unit 202 of the correlation calculation unit 123 stores the correlation coefficient between the respective blocks calculated in step S124.

In step S126, the inter-block correlation coefficient calculation unit 201 determines whether the correlation coefficients between all the blocks are generated and returns the process to step S124 to reiterate the process from step S124 to step S126, until the correlation coefficients between all the blocks are generated. When the correlation coefficients between all the blocks are generated in step S126, the inter-block correlation coefficient calculation unit 201 allows the process to proceed to step S127.

In step S127, the average calculation unit 203 calculates the average correlation coefficient, which is the average value of the correlation coefficients between the blocks calculated in step S124. In step S128, the correlation data history storage memory 124 stores, the correlation data, the correlation coefficients between the respective blocks calculated in step S124 and the average correlation coefficient calculated in step S127.

In step S129, the correlation calculation unit 123 determines whether the calculation of the correlation coefficients and the average correlation coefficient is reiterated a predetermined number of times. When the correlation calculation unit 123 determines that the calculation of the correlation coefficients and the average correlation coefficient is not reiterated the predetermined number of times, the process is turned to step S121 to reiterate the subsequent processes.

On the other hand, when the correlation calculation unit 123 determines that the calculation of the correlation coefficients and the average correlation coefficient is reiterated the predetermined number of times in step S129, the correlation calculation unit 123 allows the process to proceed to step S130.

In step S130, the correlation data history storage memory 124 outputs the retained correlation data as the evaluation index data. When the process of step S130 ends, the evaluation index data generation unit 103 ends the process of generating the evaluation index data and returns the process to step S103 of FIG. 14, so that the processes subsequent to step S104 are performed.

Flow of Correlation Evaluation Process

Figure 16:
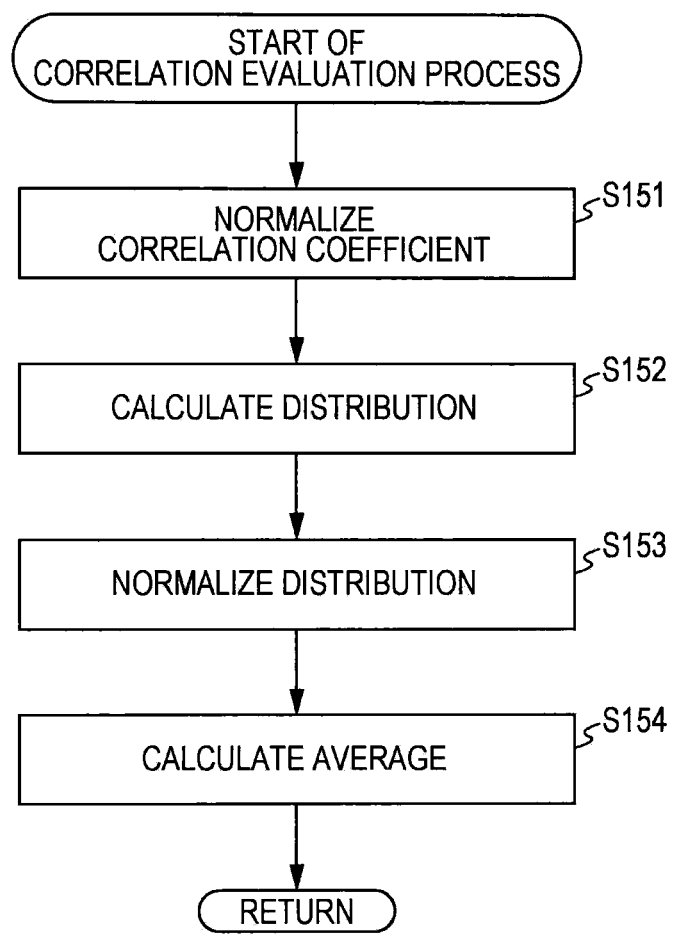
FIG. 16 is a flowchart of an example of the flow of a correlation evaluation process.

Next, an example of the flow of the correlation evaluation process performed in step S104 of FIG. 14 will be described with reference to the flowchart of FIG. 16.

When the correlation evaluation process starts, the correlation coefficient normalization unit 221 of the evaluation unit 104 normalizes the correlation coefficient between the respective blocks in step S151. In step S152, the distribution calculation unit 222 calculates the time direction distribution of the correlation coefficient between the respective blocks.

In step S153, the distribution normalization unit 223 normalizes the distribution of each correlation coefficient calculated in step S152. In step S154, the evaluation value calculation unit 224 calculates the evaluation value using the normalized correlation coefficient calculated in step S151 and the distribution of the normalized correlation coefficient calculated in step S153.

When evaluation value calculation unit 224 calculates the evaluation value, the evaluation value calculation unit 224 returns the process to step S104 of FIG. 14 to perform the processes subsequent to step S105.

The cultivated cardiac muscle evaluation apparatus 100 can quantitatively evaluates the cooperativity of the subject to be evaluated (for example, the motions of cells) by performing the various processes in this way. Further, the cultivated cardiac muscle evaluation apparatus 100 can evaluates the cooperativity of the subject to be evaluated more easily and non-invasively by using the motion vectors in the generation of the index.

2. Second Embodiment

Another Example of Evaluation Unit

The cooperativity evaluation method is not limited to the above-described example. For example, the pulsation of the cultivated muscle cells may be compared to that in an ideal normal cultivation time and the comparison result may be evaluated. In this case, a change pattern (ideal change pattern) at the pulsation ideal normal cultivation time is determined in advance.

Figure 17:
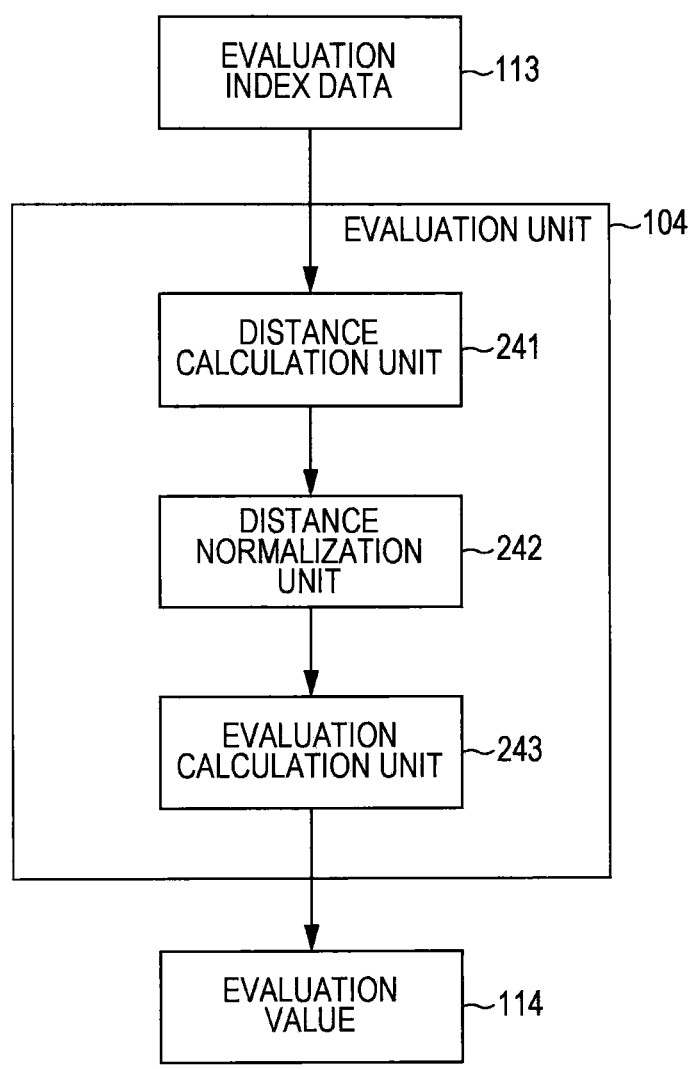
FIG. 17 is a block diagram of another example of the configuration of the evaluation unit.

FIG. 17 is a block diagram of the main configuration of the evaluation unit 104 in this case. In this case, as shown in FIG. 17, the evaluation unit 104 includes a distance calculation unit 241, a distance normalization unit 242, and an evaluation value calculation unit 243.

Figure 18A:
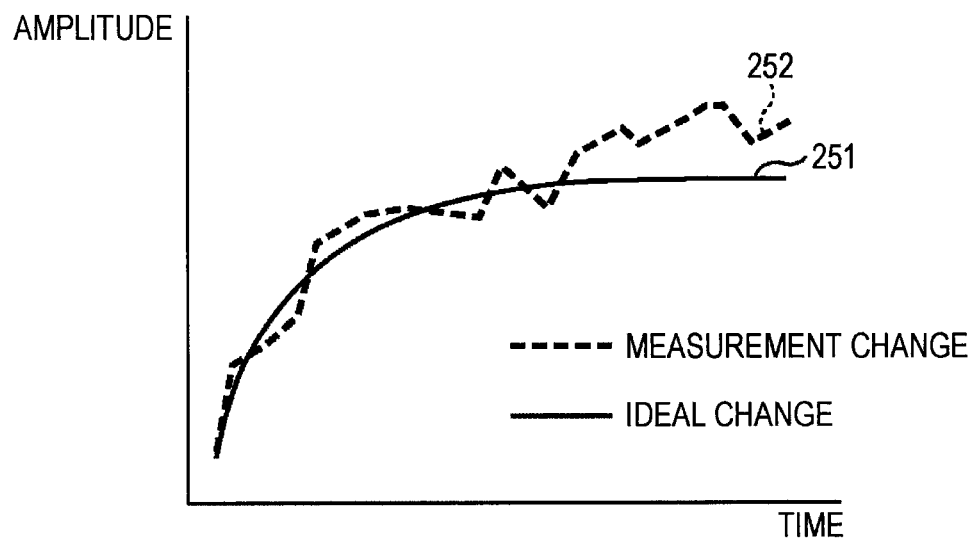
FIGS. 18A and 18B are diagrams of different examples of correlation evaluation.

The distance calculation unit 241 evaluates a similarity by comparing a change pattern (measurement change pattern) of the pulsation of the cultivated cardiac muscle cells to the ideal change pattern, as shown in the graph of FIG. 18A. In FIG. 18A, a solid line 251 indicates the ideal change pattern of the correlation between the motions of the cells in the blocks and a dotted line 252 indicates the measurement change pattern between the motions of the cells in the blocks. The smaller a difference between the ideal change pattern and the measurement change pattern is smaller, the larger the evaluation value is.

The distance calculation unit 241 calculates a sum Dc of the distances between the ideal change pattern and the measurement change pattern during respective elapsed times for respective blocks, as in Expression (9) below.

$$D_c = \sum_{k=0}^{S-1} W_c(k)\sqrt{(C(k) - C_I(k))^2} .\qquad(9)$$

In Expression (9), C(k) is a correlation coefficient of the frame image of a time k between the blocks in the measurement change pattern and $C_I(k)$ is a correlation coefficient of the frame image of a time k between the blocks in the ideal change pattern. Further, k denotes which number of times the measurement is reiterated (elapsed time) (when the measurement is reiterated S number of times, a relation of "0≤k≤S−1" is satisfied). Furthermore, $W_c(k)$ is a weight coefficient and has an any value. For example, a difference between the ideal change pattern and the measurement change pattern is not important. However, when it is necessary to approximate the ideal change pattern and the measurement change pattern to each other as the elapsed time is longer, the value of the weight coefficient $W_c$ is set to be larger as the value of k is larger.

When the sum Dc of the distances between the ideal change pattern and the measurement change pattern during respective elapsed times is obtained, the distance calculation unit 241 supplies the sum Dc of the distances to the distance normalization unit 242.

Figure 18B:
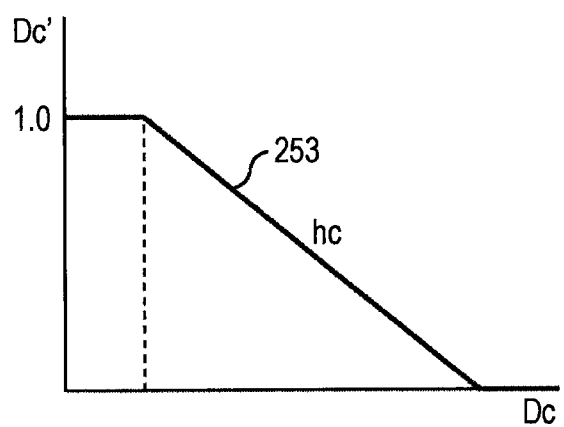

The distance normalization unit 242 normalizes the sum Dc of the distances, as in Expression (10) below, by using the solid line 253 of the graph shown in FIG. 18B and a function hc (calculates a sum Dc' of the normalized distances).

$$D'_c = h_c(D_c)\qquad(10)$$

The function hc may be any function, as long as the function hc has a larger value as the sum Dc of the distances is smaller, whereas the function hc has a smaller value as the sum Dc of the distance is larger. That is, the sum Dc' of the normalized distances has a larger value, as the distance between the ideal change pattern and the measurement change pattern is smaller, whereas the sum Dc' of the normalized distances has a smaller value, as the distance between the ideal change pattern and the measurement change pattern is larger.

The distance normalization unit 242 supplies the sum Dc' of the normalized distances to the evaluation value calculation unit 243.

The evaluation value calculation unit 243 calculates, as the evaluation values Ec, average values (M×N average values) of the sums Dc' of the normalized distance, as in Expression (11) below.

$$E_c = \frac{1}{L}\sum_{k=0}^{L-1} D'_k .\qquad(11)$$

In this case, the evaluation value Ec has a larger value, as the distance between the ideal change and the measurement change is smaller in all the frame images.

The evaluation value calculation unit 243 may calculates, the evaluation value Ec, a ratio of the number Nc2 of correlation coefficients, in which the sum Dc' of the normalized distances is equal to or greater than a predetermined threshold value Tc2, to all of the frame images, as in Expression (12) below.

$$E_c = \frac{N_{c2}}{L} .\qquad(12)$$

In Expression (12), the threshold value Tc2 is any value determined in advance. As the threshold value Tc2 is set to be larger, the evaluation reference is higher (the evaluation condition is more strict). Therefore, the evaluation value Ec is smaller. In this case, the evaluation value Ec is larger as the number of blocks is larger in which the difference between the measurement change and the ideal change is smaller and stable than the predetermined reference in all the frame images.

As described above, the evaluation unit 104 calculates the evaluation value Ec obtained by evaluating the correlation (that is, cooperativity) between the motion amounts of the blocks based on the index data for the motion amount of the pulsation of the cardiac muscle cells. More specifically, the evaluation unit 104 calculates the evaluation value Ec so that the evaluation value Ec is larger as the cooperativity between the pulsations (motions) of the respective portions of the cultivated cardiac muscle cells 110 is higher, whereas the evaluation value Ec is smaller as the cooperativity between the pulsations (motions) of the respective portions of the cultivated cardiac muscle cells 110 is lower. That is, the evaluation unit 104 can quantitatively evaluate the cooperativity between the motions of the cardiac muscle cells.

Flow of Correlation Evaluation Process

Figure 19:
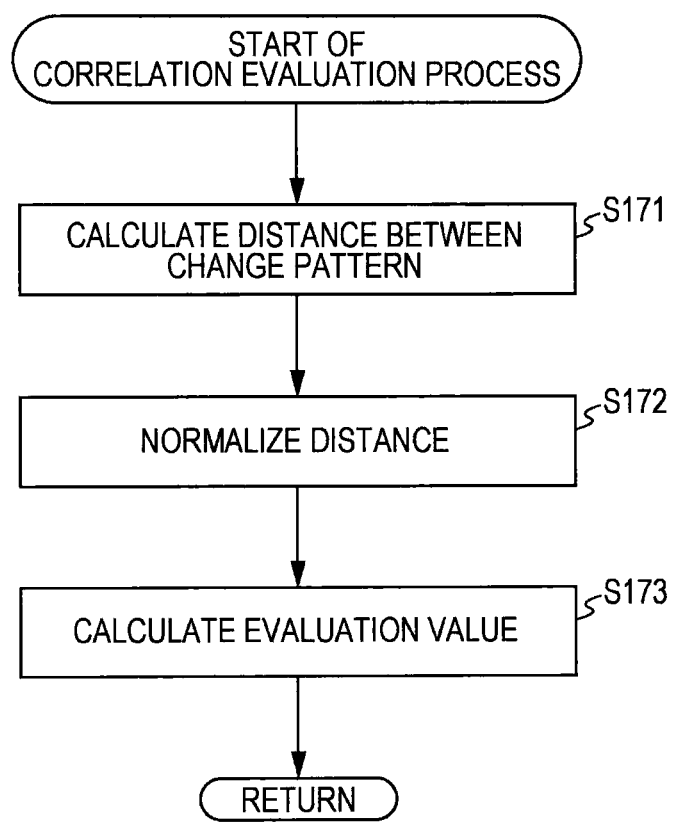
FIG. 19 is a flowchart of another example of the flow of the correlation evaluation process.

An example of the flow of the correlation evaluation process will be described with reference to the flowchart of FIG. 19.

When the correlation evaluation process starts, the distance calculation unit 241 of the evaluation unit 104 calculates the sum of the distances between the change patterns in step S171. In step S172, the distance normalization unit 242 normalizes the sum of the distances calculated in step S171.

In step S173, the evaluation value calculation unit 243 calculates the evaluation value using the sum of the distances normalized in step S172. When evaluation value calculation unit 243 calculates the evaluation value, the evaluation value calculation unit 243 ends the correlation evaluation process and returns the process to step S104 of FIG. 14 to perform the processes subsequent to step S105.

The cultivated cardiac muscle evaluation apparatus 100 can quantitatively evaluate the cooperativity of the subject to be evaluated (for example, the motions of the cells) by performing the various processes in this way. Further, the cultivated cardiac muscle evaluation apparatus 100 can evaluates the cooperativity of the subject to be evaluated more easily and non-invasively by using the motion vectors in the generation of the index.

3. Third Embodiment

Application to Another Evaluation

Another object (for example, dosing of a gas, a liquid, a solid) or any environment condition (for example, temperature, humidity, pressure, brightness, vibration, or a magnetic field) having an influence on the motion of the subject to be evaluated may be evaluated by evaluating the cooperativity of the motion of the subject to be evaluated.

The pulsations of various regions calculated through the analysis of a phase difference observation moving image of cultivated muscle cells show cooperative pulsations depending on cultivation days, but show a variation of various medicines by dosing. By detecting this variation in accordance with any method, the medicine toxicity, effect, or the like at the drug discovery can be evaluated beforehand. Therefore, an attention has recently be paid.

According to the related art, for example, there is a method of detecting the outside potential of the cells by electrodes disposed on the bottom of a cultivation plate and grasping the behavior of the pulsations of the cells by a change in a membrane potential. Further, there is a method of inputting a fluorescent pigment luminous in combination of calcium in cells, detecting the density of the calcium varied by the excitation (action potential) of the cells, detecting the pulsation rhythm of the cells, and evaluating an information propagation pattern of the cells.

However, these methods have a problem in that a specific cultivation plate is necessary, the fluorescent pigment is expensive, it is difficult to input the fluorescent pigment, or it takes some time to input the fluorescent pigment, and the like. For the reasons, there are a lot of problems with simple and non-invasive monitoring of the cells.

Accordingly, as described above, the medicine toxicity or the like is configured to be evaluated using the method of detecting the motions of the cells and evaluating the correlation (cooperativity) of the motions of the cells. The pulsations of the cardiac muscle cells include contraction and relaxing. However, for example, when the entrance and exit of the ions of the calcium of the cells are inhibited, the relaxing time is prolonged (it is difficult to return from the contracted state). The correlation between the motions of the cells is lowered due to the prolongation of the relaxing of the cells. Cells receive and transmit signals from or to other cells via gap junctions points. However, when the communication of the signals at the gap junction points is inhibited, the correlation between the motions of the cells is lowered.

That is, the influence of the dosed medicine on the cardiac muscle cells can be evaluated by evaluating the correlation between the motions of the cells. The change in the behavior of the cell pulsations can be grasped without adding a reagent such as a fluorescent pigment to the cells and without using a special cultivation plate by evaluating the correlation between the motions of the cells through the analysis of the image. Therefore, the medicine toxicity or the like can be evaluated easily and accurately.

Medicine Evaluation Apparatus

FIG. 20 is a block diagram of an example of the main configuration of a medicine evaluation apparatus. A medicine evaluation apparatus 300 shown in FIG. 20 is an apparatus which evaluates an influence (positive effect, adverse effect, or the like) of a medicine through the cooperativity of the motions of the cultivated cardiac muscle cells 110 to which the medicine is input.

As shown in FIG. 20, the medicine evaluation apparatus 300 includes an imaging unit 101 and an evaluation subject image data generation recording unit 102, as in the cultivated cardiac muscle cell evaluation apparatus 100 in FIG. 3. The imaging unit 101 images the cultivated cardiac muscle cells 110 before and after the medicine is dosed.

The evaluation subject image data generation recording unit 102 generates evaluation subject image data based on an image signal 111 supplied from the imaging unit 101 and stores the generated evaluation subject image data in, for example, an internal recording medium. That is, the evaluation subject image data are generated for respective moving images of the cultivated cardiac muscle cells 110 before and after the medicine is dosed.

The medicine evaluation apparatus 300 includes an evaluation index data generation unit 303 instead of the evaluation index data generation unit 103 of the cultivated cardiac muscle cell evaluation apparatus 100 and includes an evaluation unit 304 instead of the evaluation unit 104.

The evaluation index data generation unit 303 acquires evaluation subject image data 112 from the evaluation subject image data generation recording unit 102. The evaluation index data generation unit 303 generates evaluation index data 113 using the acquired evaluation subject image data 112 and supplies the evaluation index data 113 to the evaluation unit 304.

More specifically, the evaluation index data generation unit 303 detects the motion of the subject (the cultivated cardiac muscle cells 110) to be evaluated on each block, which is each of a plurality of partial regions divided from the entire region of the image of the subject to be evaluated, in each frame image of the supplied evaluation subject image data 112 which is, for example, a moving image of the cultivated cardiac muscle cells 110. The evaluation index data generation unit 303 expresses the detected motions of the respective blocks as a motion vector and supplies the motion vector as the evaluation index data 113 to the evaluation unit 304.

The evaluation unit 304 calculates the supplied evaluation index data 113 to calculate an evaluation value 114 of the cooperativity between the motions of the cultivated cardiac muscle cells 110 and outputs the evaluation value 114.

Figure 21A:
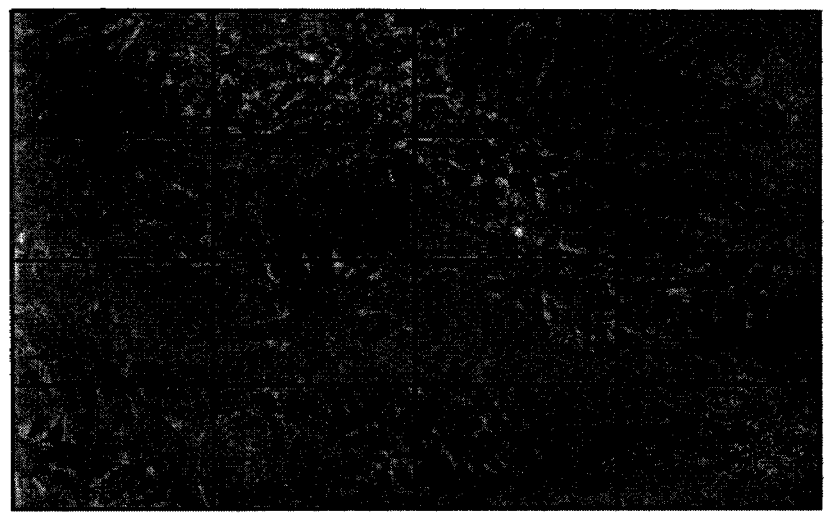
FIGS. 21A and 21B are diagrams of examples of the blocks.

More specifically, the evaluation unit 304 sets a plurality of partial regions divided from the entire frame image (observation region) and evaluates the correlation between the motion vectors of the partial regions, for example, as shown in FIG. 21A.

In the example of FIG. 21A, the frame image is divided into 4×4 partial regions (16 partial regions). The size of the partial region (that is, the division number) is arbitrary. However, when the division number is an integral multiple at the time of detecting the motion vector, it is easy to perform a calculation process.

In many cases, the correlation in the very narrow region has no large influence on the correlation evaluation result of the motion vector in the entire observation region (frame image). Accordingly, the size of the partial region (division number) is preferably set to a suitable size depending on various conditions such as the size (resolution) of the frame image, a method of moving a subject to be evaluated, and an evaluation reference (necessary precision degree), so that a calculation amount does not unnecessarily increase.

In general, the frame image is preferably divided into 4×4 partial regions, for example, as shown in FIG. 21A. Further, in general, since the motion vector is calculated in a unit smaller than the division number, the evaluation unit 304 calculates an average value of the motion vectors included in each region and sets the average value to the motion vector of each region.

Figure 21B:
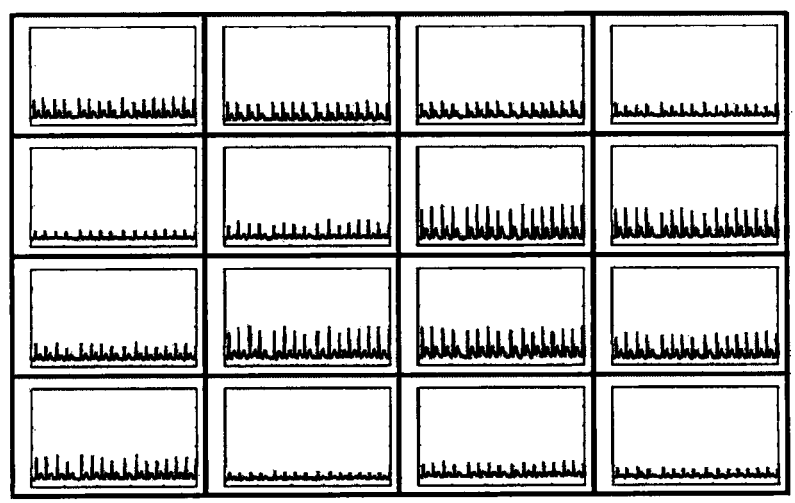

As shown in FIG. 21B, the evaluation unit 304 calculates a temporal change in the motion vector (the average value of the motion vectors in each region) of each region. Since the evaluation subject image data 112 is a moving image, the motion vector is calculated for each frame (during each sampling time). That is, the evaluation unit 304 calculates the motion vector of each region for each frame (during each sampling time). FIG. 21B shows a graph (that is, a pulsation pattern) of the temporal change in the motion vector (the absolute value of the motion vector) of each of the regions calculated by the evaluation unit 304.

Figure 22:
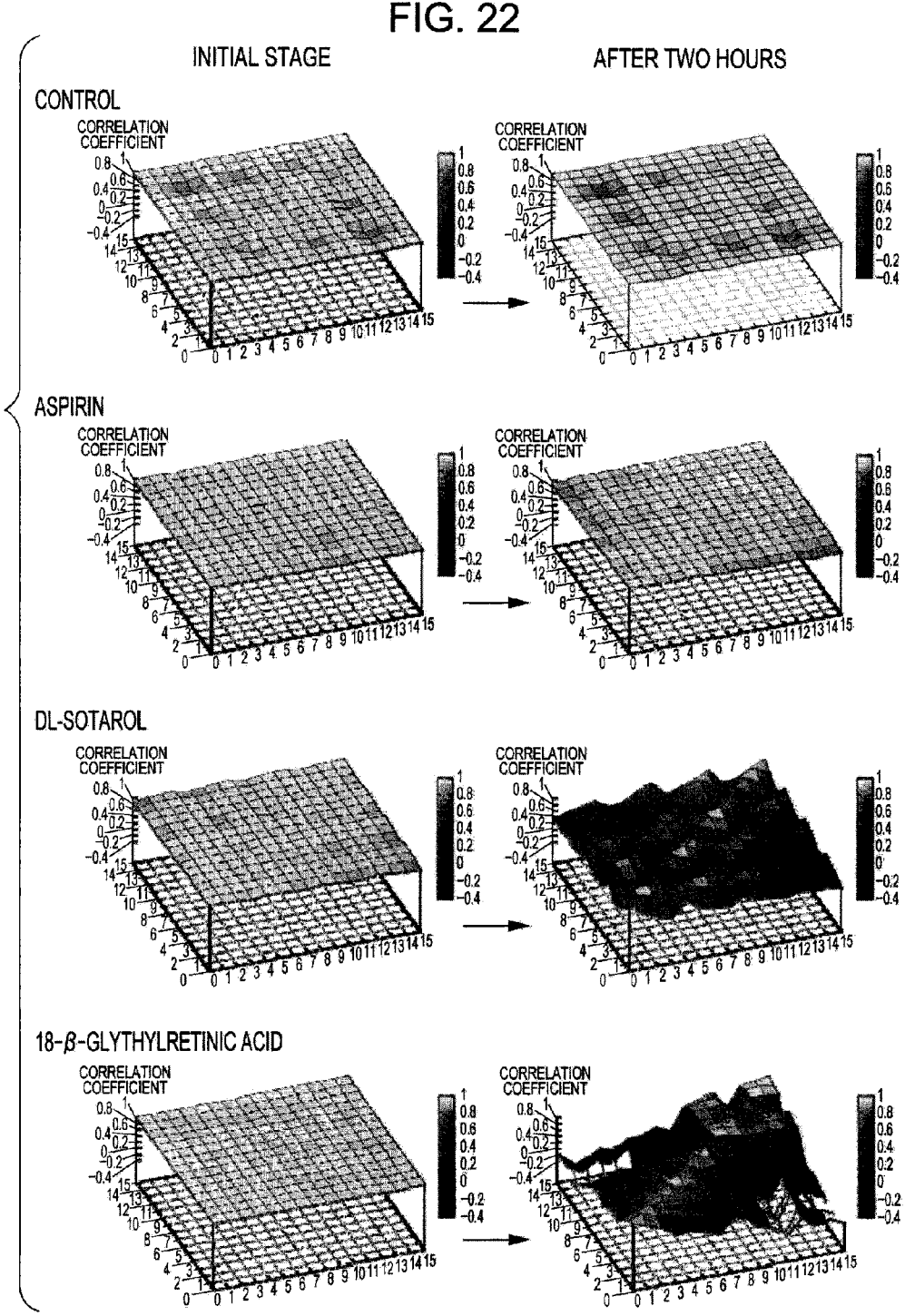
FIG. 22 is a diagram of an example of an influence of medicine dosage on the correlation between the blocks.

The evaluation unit 304 evaluates the correlation between the respective regions in all of the regions and obtains 3D plots shown in FIG. 22. The 3D plots shown in FIG. 22 are obtained by drawing the intensities of the correlations of the features between the respective regions in a 3-dimensional space. In the 3D plots shown in FIG. 22, x and y axes represent the respective regions (combination of two regions) and a z axis represents the intensity of the temporal change correlation of the motion vector (or the motion amount) between the regions. A correlation coefficient C can be calculated by Expression (13) when the perfect correlation is 1.

$$C = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad (13)$$

In this expression, a relation of "(x, y)={$(x_i, y_i)$}" (where i=1, 2, ..., n) is satisfied, x and y represent the motion amounts in the x axis direction and the y axis direction, and i represents a sample number (time). Further, x lined on its top and y lined on its top represent arithmetic averages of data x={$x_i$} and y={$y_i$}, respectively. The arithmetic average is a cosine of an angle formed between the vectors shown in Expression (14) and Expression (15) below, which indicate the deviation from the average of each data.

$$x - \bar{x} = (x_1 - \bar{x}, \ldots, x_n - \bar{x}) \quad (14)$$

$$y - \bar{y} = (y_1 - \bar{y}, \ldots, y_n - \bar{y}) \quad (15)$$

In FIG. 22, the left 3D plots represent the correlations before the medicine dosage and the right 3D plots represent correlations after two hours of the medicine dosage. Of course, evaluation (for example, 3D plotting) at any time is arbitrary.

In the example of FIG. 22, the uppermost 3D plots represent the correlations before and after dimethyl sulfoxide used as an organic solvent is dosed. The second 3D plots from the upper side represent the correlations before and after aspirin acetylsalicylic acid is dosed. The third 3D plots from the upper side represent the correlations before and after dl-sotarol is dosed. The lowermost 3D plots represent the correlations before and after 18-β-glycyrrhetinate acid is dosed.

As shown in the 3D plots of FIG. 22, dimethyl sulfoxide or aspirin acetylsalicylic acid has no large influence on the cooperativity of the pulsations of the cardiac muscle cells. On the contrary, dl-sotarol inhibits a potassium channel. That is, when dl-sotarol is dosed to cultivated cardiac muscle cells 500, a relaxation process is changed due to a change in the potassium channel function worked in the relaxation process.

Since the waveform of each pulsation is scattered, as shown in FIG. 22, the correlation between the motion vectors of the respective regions is lowered after the dosing. Further, since 18-β-glycyrrhetinate acid inhibits the gap junction point, as shown in FIG. 22, the correlation between the motion vectors of the respective regions is lowered after the dosing.

In this way, the evaluation unit 304 can easily detect the influence of the medicine on the pulsations of the cardiac muscle cells by evaluating the correlations of the motion vectors of the respective regions. By observing the correlation between the motion vectors of the partial regions, that is, the correlation between the pulsations of the cells in the observation region of the cultivated cardiac muscle cells 500, it is possible to information which may not be obtained just by observing the form of the pulsations of specific cells (specific partial region). For example, when 18-β-glycyrrhetinate acid is dosed, large extension of the relaxing waveform does not occur. However, as described above, the correlation between the cells (between partial regions) is considerably changed. Accordingly, the medicine can be evaluated with an index different from that of the case where the form of the pulsation of the specific cells is observed. The evaluation unit 304 may supply the images such as the 3D plots shown in FIG. 22 as the evaluation value 114 to a user or may supply the evaluation result obtained by quantitatively digitalizing the correlations as the evaluation value 114.

Of course, the 3D plots shown in FIG. 22 are just examples of the images. For example, the correlation between the motion vectors of the respective regions may be expressed by any image such as a line graph, a bar graph, a distribution chart, or a pattern diagram. Further, any evaluation medicine may be used and medicines other than the four kinds of medicine described above may be used.

The units will be described in detail below.

Evaluation Index Data Generation Unit

Figure 23:
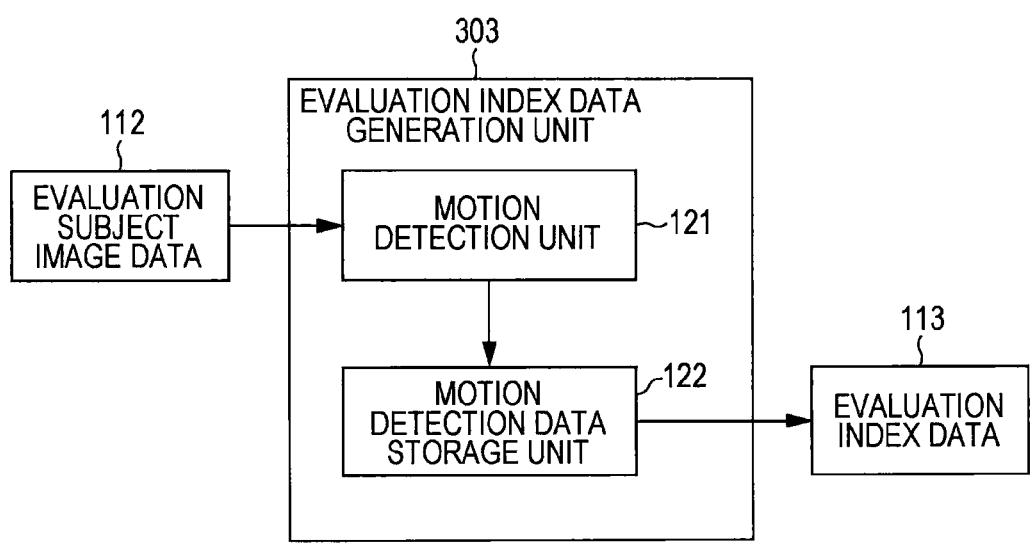
FIG. 23 is a block diagram of an example of the main configuration of an evaluation index data generation unit.

FIG. 23 is a block diagram of an example of the main configuration of the evaluation index data generation unit 303. As shown in FIG. 23, the evaluation index data generation unit 303 includes the motion detection unit 121 and the motion detection data storage unit 122. That is, the evaluation index data generation unit 303 supplies the motion detection data (motion vectors) as the evaluation index data 113 to the evaluation unit 304.

Evaluation Unit

Figure 24:
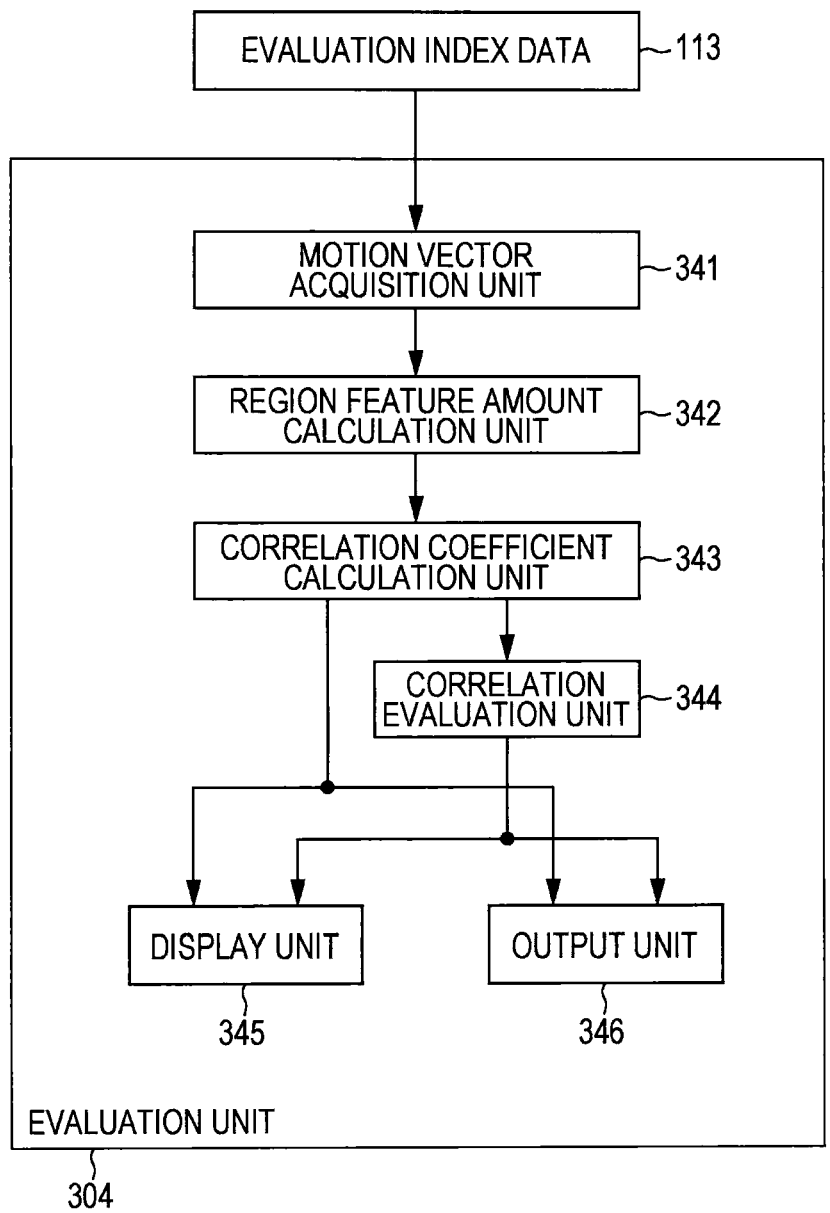
FIG. 24 is a block diagram of an example of the main configuration of an evaluation unit.

FIG. 24 is a block diagram of an example of the main configuration of the evaluation unit 304. As shown in FIG. 24, the evaluation unit 304 includes a motion vector acquisition unit 341, a region feature amount calculation unit 342, a correlation coefficient calculation unit 343, a correlation evaluation unit 344, a display unit 345, and an output unit 346.

The motion vector acquisition unit 341 acquires desired motion vectors (for example, the motion vectors corresponding to a moving image of which the correlation a user instructs to evaluate) as the evaluation index data 113 from the evaluation index data generation unit 303 (the motion detection data storage unit 122). The motion vector acquisition unit 341 supplies the acquired motion vectors to the region feature amount calculation unit 342.

The region feature amount calculation unit 342 calculates the motion vectors (the average values of the motion vectors in the regions) of the partial regions for evaluating the correlation between the above-described motion vectors and sets the temporal change in the average values (or the motion amounts) of the motion vectors to the feature amounts of the regions. The region feature amount calculation unit 342 calculates the feature amount of each region. The feature amount of each region may be a parameter indicating the temporal change in the motion (or the motion amount) of each region or may be an average value of the motion vectors of the above-described region. For example, the temporal change in the motion vector (or the motion amount) of the representative position in the region may be the feature amount of the region or the temporal change in the motion vector (or the motion amount) having the maximum value in the region may be the feature amount of the region. Of source, the motion vector (or the motion amount) having a median value in the region may be the feature amount of the region. Of course, other parameters may be the feature amount of the region. The region feature amount calculation unit 342 supplies the calculated feature amount of each region to the correlation coefficient calculation unit 343.

The correlation coefficient calculation unit 343 calculates the correlation coefficients C of the feature amounts between the partial regions, for example, by Expression (13) described above. The correlation coefficient calculation unit 343 calculates the correlation coefficients of the feature amounts in all combinations of two partial regions (all of the partial regions). Of course, the correlation coefficient of the feature amount may be calculated for only some of the partial regions. Further, any method of calculating the correlation coefficient of the feature amount can be used. The correlation coefficient calculation unit 343 may calculates the correlation coefficients by calculation other than Expression (13) described above.

The correlation coefficient calculation unit 343 supplies the calculated correlation coefficients to the display unit 345 to display the correlation coefficients or supplies the calculated correlation coefficients to the output unit 346 so as to supply the correlation coefficients to another apparatus. The correlation coefficient calculation unit 343 supplies the calculated correlation coefficients to the correlation evaluation unit 344.

The correlation evaluation unit 344 quantitatively evaluates the values of the supplied correlation coefficients. For example, the correlation evaluation unit 344 determines whether the correlation coefficient is reduced by the use of a threshold value. The correlation evaluation unit 344 supplies the evaluation result to the display unit 345 to display the evaluation result or supplies the evaluation result to the output unit 346 so as to supply the evaluation result to another apparatus.

The display unit 345 includes a display device such as a monitor so as to form an image of the data supplied from the correlation coefficient calculation unit 343 or the correlation evaluation unit 344 and display the image on the display device. For example, the display unit 345 forms and displays an image of the intensities of the correlations between the respective regions calculated by the correlation coefficient calculation unit 343 as a 3D plot drawn in a 3-dimensional space. For example, the display unit 345 forms and displays an image of the evaluation result supplied from the correlation coefficient evaluation unit 344.

The output unit 346 includes an interface such as an external terminal and outputs the data supplied from the correlation coefficient calculation unit 343 or the correlation evaluation unit 344 to an external apparatus, a network, or the like.

Thus, the medicine evaluation apparatus 300 can evaluates the influence of the medicine dosage on the pulsations of the cardiac muscle cells easily and non-invasively, when the evaluation unit 304 calculates the correlation coefficients of the temporal change in the motion vectors (or the motion amounts) between the partial regions.

Flow of Evaluation Process

Next, an example of the flow of the evaluation process performed by the medicine evaluation apparatus 300 will be described with reference to the flowchart of FIG. 25.

When the evaluation process starts, the imaging unit 101 of the medicine evaluation apparatus 300 images a subject to be evaluated in step S301. In step S302, the evaluation subject image data generation recording unit 102 generates the evaluation subject image data from the image signal obtained through the imaging of step S301.

In step S303, the evaluation index data generation unit 303 generates the evaluation index data by the use of the evaluation subject image data generated in step S302. In step S304, the evaluation unit 304 evaluates the influence of the medicine by examining the correlation (cooperativity) between the partial regions of the pulsations of the cultivated cardiac muscle cells 110 before and after the medicine dosage by the use of the evaluation index data generated in step S303.

In step S305, the output unit 346 of the evaluation unit 304 outputs the evaluation value calculated in step S304 to the outside of the medicine evaluation apparatus 300, and then the process ends. In step S305, the output unit 346 may not output the evaluation value, but the display unit 345 forms an image of the evaluation value, as described above, and may output the image to a display device. As described above, the display unit 345 may form an image of a correlation coefficient group calculated in step S304 and may display the image on a display device. Alternatively, the output unit 346 may output the correlation coefficient group to the outside of the medicine evaluation apparatus 300.

Flow of Process of Generating Evaluation Index Data

Next, an example of the flow of the process of generating the evaluation index data in step S303 of FIG. 25 will be described with reference to the flowchart of FIG. 26.

When the process of generating the evaluation index data starts, the motion detection unit 121 of the evaluation index data generation unit 303 detects the motion of the subject to be evaluated for each block and generates the motion vector in step S321. In step S322, the motion detection data storage unit 122 stores the motion vector of each block generated in step S321.

In step S323, the motion detection unit 121 determines whether to perform the motion detection during the predetermined period (evaluation interval). During the predetermine evaluation interval, when the motion detection unit 121 determines that there is the frame image which is not subjected to the motion detection, the motion detection unit 121 returns the process to step S321 to reiterate the motion detection on the frame image to be newly processed.

Figure 25:
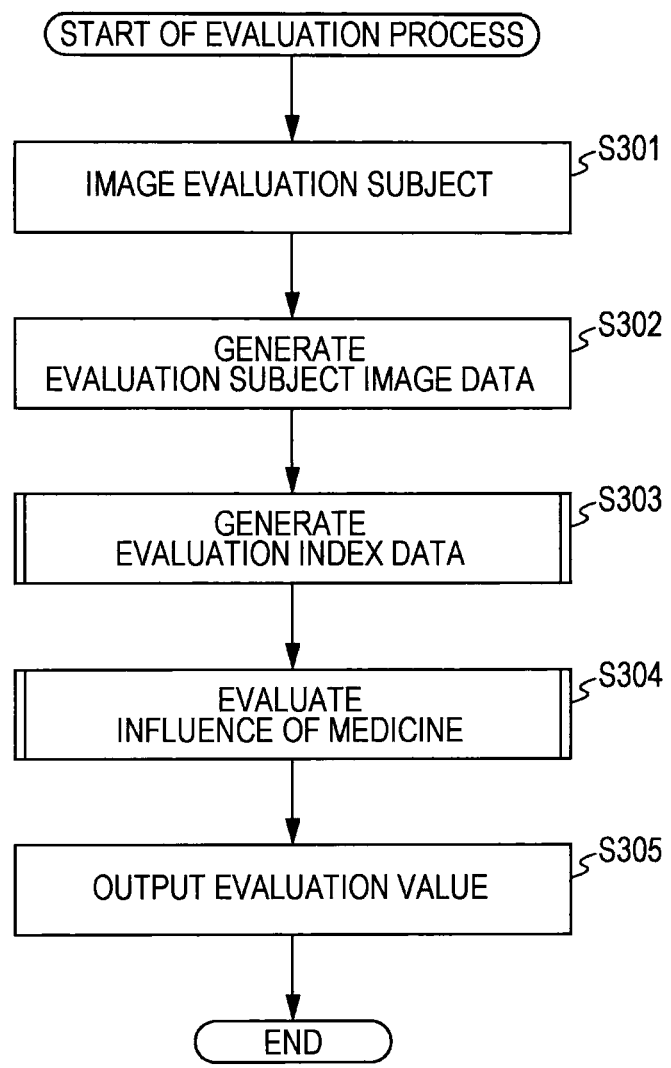
FIG. 25 is a flowchart of an example of the flow of an evaluation process.
Figure 26:
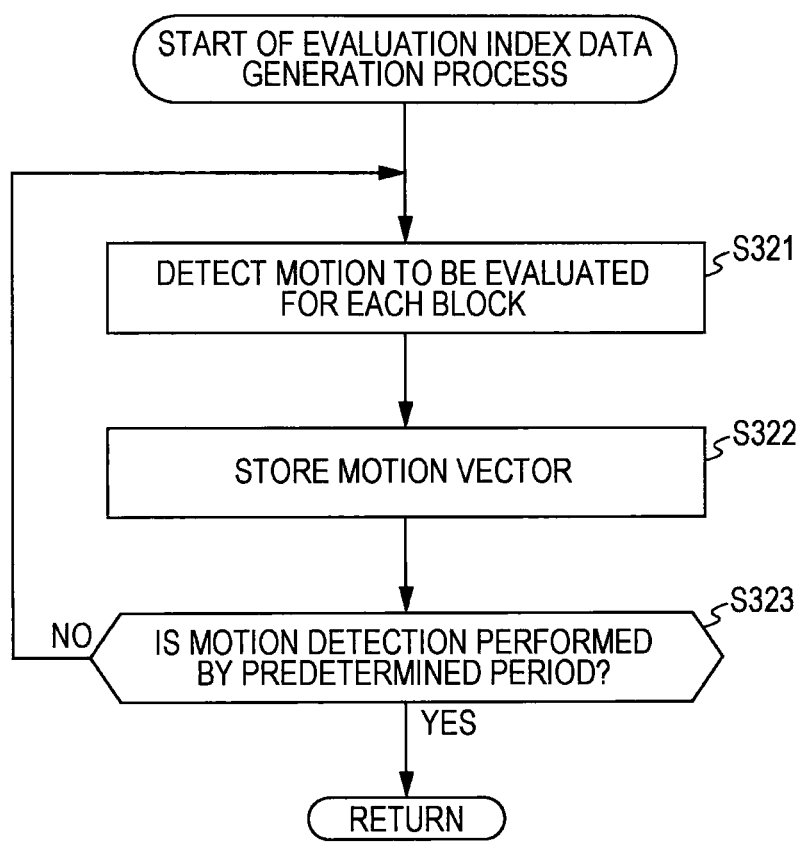
FIG. 26 is a flowchart of an example of the flow of a process of generating the evaluation index data.

In step S323, when the motion detection unit 121 determines that all of the frame images to be processed during the predetermined evaluation interval are subjected to the motion detection, the motion detection unit 121 ends the process of generating the evaluation index data and returns the process to the evaluation process of FIG. 25 to perform the processes subsequent to step S304.

Flow of Influence Evaluation Process

Figure 27:
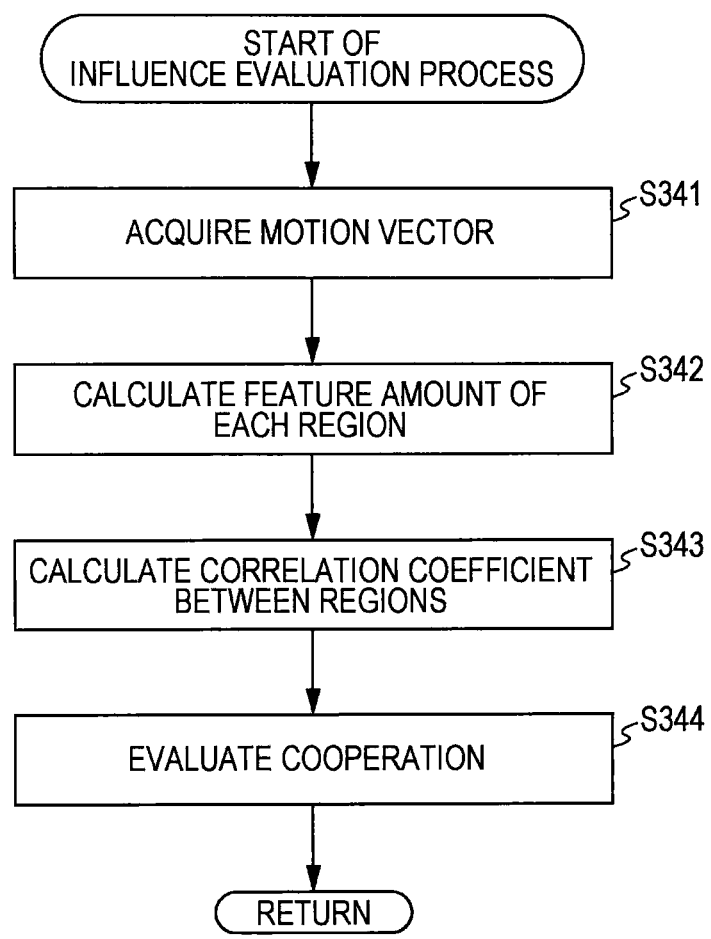
FIG. 27 is a flowchart of an example of the flow of an influence evaluation process.

Next, an example of the flow of the influence evaluation process performed in step S304 of FIG. 25 will be described with reference to the flowchart of FIG. 27.

When the influence evaluation process starts, the motion vector acquisition unit 341 of the evaluation unit 304 acquires the desired motion vectors from the motion detection data storage unit 122 in step S341.

In step S342, the region feature amount calculation unit 342 calculates the feature amount of each region using the motion vector acquired in step S341. In step S343, the correlation coefficient calculation unit 343 calculates the correlation coefficient between the regions for the feature amount calculated in step S342.

In step S344, the correlation evaluation unit 344 evaluates the cooperativity (the correlation between the pulsations) between the regions by evaluating the correlation coefficient calculated in step S343. When the process of step S344 ends, the correlation evaluation unit 344 ends the influence evaluation process and returns the process to the evaluation process of FIG. 25 to perform the processes subsequent to step S305.

Thus, the medicine evaluation apparatus 300 can evaluates the influence of the medicine dosage on the pulsations of the cardiac muscle cells with ease, when the evaluation unit 304 calculates the correlation coefficients of the temporal change in the motion vectors (or the motion amounts) between the partial regions. Since a special cultivation plate or a fluorescent reagent is not used according to this method, the evaluation can be simply performed non-invasively at low cost and is suitable for automation. Further, according to this method, an experiment can be carried out at the observation region within a relatively narrow range such as about 0.6 mm square and with the small number of cells. The evaluation can be sufficiently performed with a high-density cultivation plate (1536 hole plate (1.7 mm diameter/1 well) or a 384 hole plate (3.6 mm diameter/1 well)) generally available. The evaluation is also suitable for initial screening in drug discovery. This technique is applicable to any evaluation as long as the evaluation can be performed through observation of the cultivated cardiac muscle cells 110.

4. Fourth Embodiment

Personal Computer

The above-described series of processes may be executed by hardware or software. In this case, for example, a personal computer shown in FIG. 28 is configured.

Figure 28:
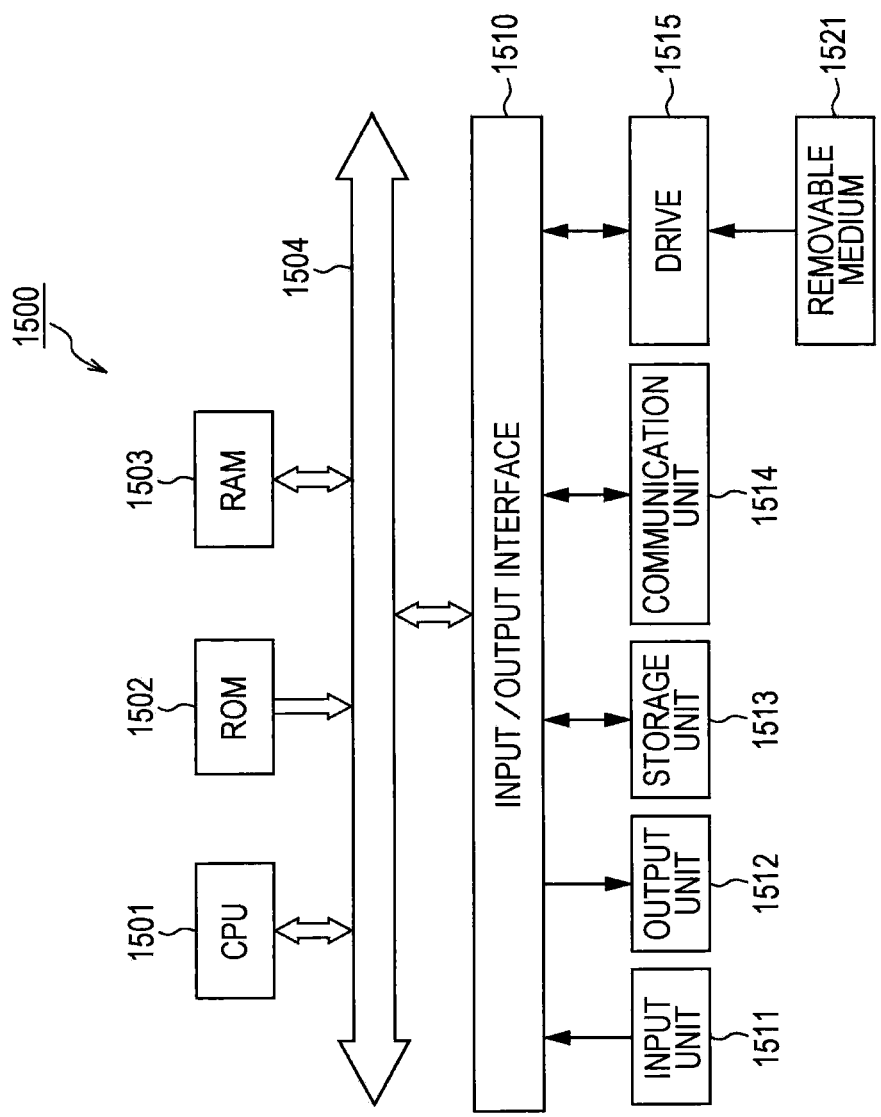
FIG. 28 is a block diagram of an example of the main configuration of a personal computer.

In FIG. 28, a CPU (Central Processing Unit) 1501 of a personal computer 1500 executes various kinds of processes in accordance with a program stored in a ROM (Read Only Memory) 1502 or a program loaded on a RAM (Random Access Memory) 1503 from a storage unit 1513. The CPU 1501 executes the various kinds of processes on the RAM 1503 and data or the like are appropriately stored in the RAM 1503.

The CPU 1501, the ROM 1502, and the RAM 1503 are connected to each other via a bus 1504. An input/output interface 1510 is also connected to the bus 1504.

An input unit 1511 realized by a keyboard, a mouse, or the like, a display realized by a CRT (Cathode Ray Tube) or an LCD (Liquid Crystal Display), an output unit 1512 realized a speaker or the like, a storage unit 1513 realized by a hard disk or the like, and a communication unit 1514 realized by a modem or the like are connected to the input/output interface 1510. The communication unit 1514 executes a communication process through a network including the Internet.

A drive 1515 is connected to the input/output interface 1510, if necessary, and a removable medium 1521 such as a magnetic disc, an optical disc, a magnetic optical disc, or a semiconductor memory is appropriately mounted so that a computer program read therefrom is installed in the storage unit 1513, if necessary.

When the above-described series of processes are executed by software, a program for the software is installed from a network or a recording medium.

For example, as shown in FIG. 28, apart from the apparatus body, the recording medium is configured not only by the removable medium 1521 realized by a magnetic disc (including a flexible disc), an optical disc (including a CD-ROM (Compact Disc-Read Only Memory) and a DVD (Digital Versatile Disc)), a magnetic optical disk (including an MD (Mini Disc)), or a semiconductor memory, which stores the program and is distributed to deliver the program to users, but also by the ROM 1502, which stores the program and is delivered users in a state embedded in the apparatus body, or a hard disk or the like included in the storage unit 1513.

The program executed by the computer may be a program executed chronologically in the order described in the specification or may be a program executed in parallel or at a necessary time when called.

In the specification, the steps of describing the program stored in the recording medium include not only processes which are chronologically in the described order, but also processes which may not necessarily be processed but may be processed in parallel or individually.

In the specification, a system refers to the entire apparatus including a plurality of devices (apparatuses).

The configuration described above as a single apparatus (or a processing unit) may be divided and configured by a plurality of apparatuses (or processing units). On the contrary, the configurations described above as the plurality of apparatuses (or processing units) may be collected into a single apparatus (or a processing unit). Of course, other configurations other than the above-described configurations may be added to the configuration of each apparatus (or each processing unit). Further, when the configurations of the operations of the entire system are substantially the same as each other, a part of the configuration of an apparatus (or a processing unit) may be included in the configuration of another apparatus (or another processing unit). That is, this technique is not limited to the above-described embodiments, but may be modified in various forms within the scope of the technique without departing from the gist of the technique.

According to the technique, the following configurations may be realized.

(1) An image processing apparatus includes: a motion detection unit detecting a motion of a subject to be evaluated by using an image of the subject to be evaluated; a correlation calculation unit calculating a temporal change correlation between motion amounts of a plurality of portions of the subject to be evaluated, by using a motion vector indicating the motion of the subject to be evaluated, which is detected by the motion detection unit; and an evaluation value calculation unit calculating an evaluation value to evaluate cooperativity of the motion of the subject to be evaluated by using the correlation calculated by the correlation calculation unit.

(2) In the image processing apparatus described in (1), the motion detection unit divides the entire region of the image of the subject to be evaluated into a plurality of partial regions and detects the motions of the respective partial regions, the correlation calculation unit calculates the correlation between the partial regions using the motion vector calculated for each partial region by the motion detection unit, and the evaluation value calculation unit calculates the evaluation value by using the correlation between the partial regions calculated by the correlation calculation unit.

(3) In the image processing apparatus described in (2), the evaluation value calculation unit includes a correlation normalization unit normalizing the correlation between the partial regions calculated by the correlation calculation unit to a predetermined function, a distribution calculation unit calculating a time direction distribution of the correlation between the partial regions calculated by the correlation calculation unit, a distribution normalization unit normalizing the distribution calculated by the distribution calculation unit to a predetermined function, and an average/evaluation value calculation unit calculating, as the evaluation value, an average value of products of the correlations between the partial regions normalized by the correlation normalization unit and the distributions normalized by the distribution normalization unit, in the entire image of the subject to be evaluated.

(4) In the image processing apparatus described in (2) or (3), the evaluation value calculation unit includes a correlation normalization unit normalizing the correlation between the partial regions calculated by the correlation calculation unit to a predetermined function, a distribution calculation unit calculating a time direction distribution of the correlation between the partial regions calculated by the correlation calculation unit, a distribution normalization unit normalizing the distribution calculated by the distribution calculation unit to a predetermined function, and an average/evaluation value calculation unit calculating, as the evaluation value, a ratio of the number of products, which are products of the correlations between the partial regions normalized by the correlation normalization unit and the distributions normalized by the distribution normalization unit, having a value larger than a predetermined threshold value to the total number of products.

(5) In the image processing apparatus described in (2) to (4), the evaluation value calculation unit includes a distance calculation unit calculating a difference between an ideal change, which is an ideal temporal change determined in advance, and a measurement change, which is a temporal change detected by the motion detection unit, in the correlation between the partial regions calculated by the correlation calculation unit, a normalization unit normalizing the differences calculated by the distance calculation unit to a predetermined function, and a difference average value calculation unit calculating, as the evaluation value, an average value of the differences normalized by the normalization unit.

(6) In the image processing apparatus described in (2) to (5), the evaluation value calculation unit includes a distance calculation unit calculating a difference between an ideal change, which is an ideal temporal change determined in advance, and a measurement change, which is a temporal change detected by the motion detection unit, in the correlation between the partial regions calculated by the correlation calculation unit, a normalization unit normalizing the differences calculated by the distance calculation unit to a predetermined function, and an average/evaluation value calculation unit calculating, as the evaluation value, a ratio of the number of average values, which are average values of the differences normalized by the normalization unit, having a value larger than a predetermined threshold value to the total number of average values.

(7) In the image processing apparatus described in (2) to (6), the correlation calculation unit calculates the correlation between the partial regions for some or all of the partial regions, and the evaluation calculation unit displays a 3D plot by imaging intensities of the correlations between the respective partial regions calculated by the correlation calculation unit in a 3-dimensional space.

(8) In the image processing apparatus described in (1) to (7), the evaluation value calculation unit calculates the evaluation value so that the cooperativity is higher as the evaluation value is higher.

(9) In the image processing apparatus described in (1) to (8), the evaluation value calculation unit calculates the evaluation value so that the cooperativity is lower as the evaluation value is lower.

(10) The image processing apparatus described in (1) to (9) further includes an imaging unit obtaining an image of the subject to be evaluated by imaging the subject to be evaluated. The motion detection unit detects the motion of the subject to be evaluated by using the image of the subject to be evaluated, which is obtained by the imaging unit.

(11) In the image processing apparatus described in (1) to (10), the correlation calculation unit repeatedly calculates the correlation between the temporal changes in the motion amounts in the plurality of portions of the subject to be evaluated.

(12) In the image processing apparatus described in (1) to (11), the subject to be evaluated is a cell moving spontaneously.

(13) In the image processing apparatus described in (1) to (12), the subject to be evaluated is a cultivated cell produced by cultivating a cell picked from a living body.

(14) An image processing method includes: detecting, by a motion detection unit of an image processing apparatus, a motion of a subject to be evaluated by using an image of the subject to be evaluated; calculating, by a correlation calculation unit of the image processing apparatus, a temporal change correlation between motion amounts of a plurality of portions of the subject to be evaluated, by using a motion vector indicating the motion of the subject to be evaluated, which is detected by the motion detection unit; and calculating, by an evaluation value calculation unit of the image processing apparatus, an evaluation value to evaluate cooperativity of the motion of the subject to be evaluated, by using the correlation calculated by the correlation calculation unit.

(15) A program causes a computer to function as: a motion detection unit detecting a motion of a subject to be evaluated by using an image of the subject to be evaluated; a correlation calculation unit calculating a temporal change correlation between motion amounts of a plurality of portions of the subject to be evaluated, by using a motion vector indicating the detected motion of the subject to be evaluated; and an evaluation value calculation unit calculating an evaluation value to evaluate cooperativity of the motion of the subject to be evaluated, by using the calculated correlation.

The present disclosure contains subject matter related to that disclosed in Japanese Priority Patent Application JP 2010-234505 filed in the Japan Patent Office on Oct. 19, 2010 and Japanese Priority Patent Application JP 2011-043329 filed in the Japan Patent Office on Feb. 28, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a motion detection unit detecting a motion of a subject to be evaluated by using an image of the subject to be evaluated;
   a correlation calculation unit calculating a temporal change correlation between motion amounts of a plurality of portions of the subject to be evaluated, by using a motion vector indicating the motion of the subject to be evaluated, which is detected by the motion detection unit; and
   an evaluation value calculation unit calculating an evaluation value to evaluate cooperativity of the motion of the subject to be evaluated by using the correlation calculated by the correlation calculation unit,
   wherein the motion detection unit divides the entire region of the image of the subject to be evaluated into a plurality of partial regions and detects the motions of the respective partial regions, wherein the correlation calculation unit calculates the correlation between the partial regions using the motion vector calculated for each partial region by the motion detection unit, wherein the evaluation value calculation unit calculates the evaluation value by using the correlation between the partial regions calculated by the correlation calculation unit, and wherein the evaluation value calculation unit includes
- a correlation normalization unit normalizing the correlation between the partial regions calculated by the correlation calculation unit to a predetermined function,
- a distribution calculation unit calculating a time direction distribution of the correlation between the partial regions calculated by the correlation calculation unit,
- a distribution normalization unit normalizing the distribution calculated by the distribution calculation unit to a predetermined function, and
- an average/evaluation value calculation unit calculating, as the evaluation value, a ratio of the number of products, which are products of the correlations between the partial regions normalized by the correlation normalization unit and the distribution normalized by the distribution normalization unit, having a value larger than a predetermined threshold value to the total number of products.

2. An image processing apparatus comprising:

a motion detection unit detecting a motion of a subject to be evaluated by using an image of the subject to be evaluated;

a correlation calculation unit calculating a temporal change correlation between motion amounts of a plurality of portions of the subject to be evaluated, by using a motion vector indicating the motion of the subject to be evaluated, which is detected by the motion detection unit; and an evaluation value calculation unit calculating an evaluation value to evaluate cooperativity of the motion of the subject to be evaluated by using the correlation calculated by the correlation calculation unit, wherein the motion detection unit divides the entire region of the image of the subject to be evaluated into a plurality of partial regions and detects the motions of the respective partial regions, wherein the correlation calculation unit calculates the correlation between the partial regions using the motion vector calculated for each partial region by the motion detection unit, wherein the evaluation value calculation unit calculates the evaluation value by using the correlation between the partial regions calculated by the correlation calculation unit, and wherein the evaluation value calculation unit includes
- a distance calculation unit calculating a difference between an ideal change, which is an ideal temporal change determined in advance, and a measurement change, which is a temporal change detected by the motion detection unit, in the correlation between the partial regions calculated by the correlation calculation unit,
- a normalization unit normalizing the differences calculated by the distance calculation unit to a predetermined function, and
- a difference average value calculation unit calculating, as the evaluation value, an average value of the differences normalized by the normalization unit.

3. The image processing apparatus according to claim 2, wherein the evaluation value calculation unit
calculates, as the evaluation value, a ratio of the number of average values, having a value larger than a predetermined threshold value to the total number of average values.

4. The image processing apparatus according to claim 1,
wherein the correlation calculation unit calculates the correlation between the partial regions for some or all of the partial regions, and
wherein the evaluation value calculation unit displays a 3D plot by imaging intensities of the correlations between the respective partial regions calculated by the correlation calculation unit in a 3-dimensional space.

5. The image processing apparatus according to claim 1, wherein the evaluation value calculation unit calculates the evaluation value so that the cooperativity is higher as the evaluation value is higher.

6. The image processing apparatus according to claim 1, wherein the evaluation value calculation unit calculates the evaluation value so that the cooperativity is lower as the evaluation value is lower.

7. The image processing apparatus according to claim 1, further comprising:
an imaging unit obtaining an image of the subject to be evaluated by imaging the subject to be evaluated,
wherein the motion detection unit detects the motion of the subject to be evaluated by using the image of the subject to be evaluated, which is obtained by the imaging unit.

8. The image processing apparatus according to claim 1, wherein the correlation calculation unit repeatedly calculates the correlation between the temporal changes in the motion amounts in the plurality of portions of the subject to be evaluated.

9. The image processing apparatus according to claim 1, wherein the subject to be evaluated is a cell moving spontaneously.

10. The image processing apparatus according to claim 1, wherein the subject to be evaluated is a cultivated cell produced by cultivating a cell picked from a living body.

11. An image processing method comprising:
detecting, by a motion detection unit of an image processing apparatus, a motion of a subject to be evaluated by using an image of the subject to be evaluated;
calculating, by a correlation calculation unit of the image processing apparatus, a temporal change correlation between motion amounts of a plurality of portions of the subject to be evaluated, by using a motion vector indicating the motion of the subject to be evaluated, which is detected by the motion detection unit; and
calculating, by an evaluation value calculation unit of the image processing apparatus, an evaluation value to evaluate cooperativity of the motion of the subject to be evaluated, by using the correlation calculated by the correlation calculation unit,
wherein the entire region of the image of the subject to be evaluated is divided by the motion detection unit into a plurality of partial regions and the motions of the respective partial regions are detected,
wherein the correlation between the partial regions is calculated by the correlation calculation unit using the motion vector calculated for each partial region by the motion detection unit,
wherein the evaluation value is calculated by the evaluation value calculation unit by using the correlation between the partial regions calculated by the correlation calculation unit, wherein the correlation between the partial regions calculated by the correlation calculation unit is normalized by a correlation normalization unit to a predetermined function, wherein a time direction distribution of the correlation between the partial regions calculated by the correlation calculation unit is calculated by a distribution calculation unit, wherein the distribution calculated by the distribution calculation unit is normalized by a distribution normalization unit to a predetermined function, and wherein a ratio of the number of products, which are products of the correlations between the partial regions normalized by the correlation normalization unit and the distribution normalized by the distribution normalization unit, having a value larger than a predetermined threshold value to the total number of products is calculated by an average/evaluation value calculation unit as the evaluation value.

12. A non-transitory computer-readable medium having embodied thereon a program, which when executed by a computer, causes the computer to perform an image processing method, the method comprising:

detecting, by a motion detection unit, a motion of a subject to be evaluated by using an image of the subject to be evaluated;

calculating, by a correlation calculation unit, a temporal change correlation between motion amounts of a plurality of portions of the subject to be evaluated, by using a motion vector indicating the detected motion of the subject to be evaluated; and calculating, by an evaluation value calculation unit, an evaluation value to evaluate cooperativity of the motion of the subject to be evaluated, by using the calculated correlation, wherein the entire region of the image of the subject to be evaluated is divided by the motion detection unit into a plurality of partial regions and the motions of the respective partial regions are detected, wherein the correlation between the partial regions is calculated by the correlation calculation unit using the motion vector calculated for each partial region by the motion detection unit, wherein the evaluation value is calculated by the evaluation value calculation unit by using the correlation between the partial regions calculated by the correlation calculation unit, wherein the correlation between the partial regions calculated by the correlation calculation unit is normalized by a correlation normalization unit to a predetermined function, wherein a time direction distribution of the correlation between the partial regions calculated by the correlation calculation unit is calculated by a distribution calculation unit, wherein the distribution calculated by the distribution calculation unit is normalized by a distribution normalization unit to a predetermined function, and wherein a ratio of the number of products, which are products of the correlations between the partial regions normalized by the correlation normalization unit and the distribution normalized by the distribution normalization unit, having a value larger than a predetermined threshold value to the total number of products is calculated by an average/evaluation value calculation unit as the evaluation value.

* * * * *